US008799040B2

(12) United States Patent
Carter

(10) Patent No.: US 8,799,040 B2
(45) Date of Patent: Aug. 5, 2014

(54) ENGINE, SYSTEM AND METHOD OF PROVIDING BUSINESS VALUATION AND DATABASE SERVICES USING ALTERNATIVE PAYMENT ARRANGEMENTS

(75) Inventor: Michael M. Carter, Wayne, PA (US)

(73) Assignee: BizEquity LLC, Wayne, PA (US)

( * ) Notice: Subject to any disclaimer, the term of this patent is extended or adjusted under 35 U.S.C. 154(b) by 0 days.

(21) Appl. No.: 13/312,426

(22) Filed: Dec. 6, 2011

(65) Prior Publication Data

US 2012/0310686 A1 Dec. 6, 2012

Related U.S. Application Data

(60) Provisional application No. 61/547,182, filed on Oct. 14, 2011, provisional application No. 61/493,647, filed on Jun. 6, 2011.

(51) Int. Cl.
G06Q 10/00 (2012.01)
(52) U.S. Cl.
USPC .......................................... 705/7.11
(58) Field of Classification Search
CPC .................................... G06Q 10/063
USPC .......................................... 705/7.11
See application file for complete search history.

(56) References Cited

U.S. PATENT DOCUMENTS

| 7,171,384 | B1 * | 1/2007 | Fitzpatrick et al. | 705/36 R |
|---|---|---|---|---|
| 7,177,831 | B1 * | 2/2007 | O'Shaughnessy et al. | 705/36 R |
| 7,580,848 | B2 * | 8/2009 | Eder | 705/7.11 |
| 7,693,733 | B2 * | 4/2010 | Eder | 705/7.37 |
| 8,468,075 | B2 * | 6/2013 | Carter | 705/35 |
| 8,606,664 | B2 * | 12/2013 | Carter | 705/30 |
| 8,630,884 | B2 * | 1/2014 | Carter | 705/7.11 |
| 8,666,851 | B2 * | 3/2014 | Carter | 705/30 |
| 2004/0024674 | A1 * | 2/2004 | Feldman | 705/36 |
| 2004/0128174 | A1 * | 7/2004 | Feldman | 705/7 |
| 2004/0158479 | A1 * | 8/2004 | Adhikari | 705/1 |
| 2005/0119922 | A1 * | 6/2005 | Eder | 705/7 |
| 2007/0130043 | A1 * | 6/2007 | O'Shaughnessy et al. | 705/36 R |

(Continued)

OTHER PUBLICATIONS

Ross & Company-Business Valuation Report for Tentex Toy available at http://www.rosscompanycpa.com/images/Certified_Valuation_Report_Example.pdf.*

(Continued)

Primary Examiner — Beth V Boswell
Assistant Examiner — Jeffrey Zimmerman
(74) Attorney, Agent, or Firm — Barnes & Thornburg LLP; Thomas J. McWilliams; Edward F. Behm, Jr.

(57) ABSTRACT

A computer-implemented engine, system and method for generating business valuations, scoring, and/or flagging over a network, responsively to information input by a user remote from the engine, system and method. The invention may include a graphical user interface capable of locally querying a user to input the company information, at least one network port capable of remotely receiving the company information from the graphical user interface, and at least one engine communicatively connected to the at least one network port, which engine preferably includes a plurality of rules to generate, responsively to the input company information, at least one of a business valuation, a business score, and/or one or more business flags to be used as indicators in a network marketplace, for the company associated with the inputted company information.

20 Claims, 34 Drawing Sheets

(56) References Cited

U.S. PATENT DOCUMENTS

| | | | |
|---|---|---|---|
| 2007/0250327 A1* | 10/2007 | Hedy | 705/1 |
| 2007/0250362 A1* | 10/2007 | Vacante et al. | 705/7 |
| 2008/0059348 A1* | 3/2008 | Glassman et al. | 705/35 |
| 2008/0071588 A1* | 3/2008 | Eder | 705/7 |
| 2008/0235153 A1* | 9/2008 | Tombs et al. | 705/36 R |
| 2009/0299815 A1* | 12/2009 | Lewis et al. | 705/10 |
| 2010/0094685 A1* | 4/2010 | Young | 705/10 |
| 2010/0250307 A1* | 9/2010 | Hollas | 705/7 |
| 2012/0310682 A1* | 12/2012 | Carter | 705/7.11 |
| 2012/0310683 A1* | 12/2012 | Carter | 705/7.11 |
| 2012/0310684 A1* | 12/2012 | Carter | 705/7.11 |
| 2012/0310685 A1* | 12/2012 | Carter | 705/7.11 |
| 2012/0310686 A1* | 12/2012 | Carter | 705/7.11 |
| 2012/0310687 A1* | 12/2012 | Carter | 705/7.11 |
| 2012/0310795 A1* | 12/2012 | Carter | 705/30 |
| 2012/0310796 A1* | 12/2012 | Carter | 705/30 |
| 2012/0310797 A1* | 12/2012 | Carter | 705/30 |
| 2012/0310798 A1* | 12/2012 | Carter | 705/30 |
| 2012/0310806 A1* | 12/2012 | Carter | 705/35 |
| 2012/0310844 A1* | 12/2012 | Carter | 705/306 |
| 2012/0310845 A1* | 12/2012 | Carter | 705/306 |
| 2012/0316901 A1* | 12/2012 | Carter | 705/7.11 |
| 2012/0330729 A1* | 12/2012 | Carter | 705/7.39 |
| 2013/0006684 A1* | 1/2013 | Carter | 705/7.11 |
| 2013/0013379 A1* | 1/2013 | Carter | 705/7.39 |
| 2013/0024386 A1* | 1/2013 | Carter | 705/306 |

OTHER PUBLICATIONS

Palmiter—Law& Valuation, available at http://users.wfu.edu/palmitar/Law& Valuation~chapter%205~5-1-2.htm.*

* cited by examiner

HOME  VALUATION TOOL  ABOUT BIZEMPIRE                                      Help  Contact

BIZ|EMPIRE
*What's Your Empire Worth?*

BizResources

Nobitio mil iusam sitae illenihiciis debisqu at- ecto erfero tectota quati- unto omnia nonsequibea venem. Nequia con ero vendunt unitio ipsam fuga. Orro dolorep edipitemodi.

Legal Services
- Icti doluptat.
- Ovit aut voloreper
- is aut alit, officia nis

Marketing
- Sunte nobis sitat
- laborerum vella
- repudae veribus
- si dolum facipis ese
- dia sit fuga Sa velest

BizListings
- Optas relurionsera
- nos ad que ex
- platque pliquis
- autemporem que

Capital
- Libusapis dolupid ut
- et vel experup tate
- cus excea nit et ut
- et et aut quiant do-

Staffing
- Min etus miliquas
- ent magnatel ipsum
- quia qui de nobis
- atas raerchicias

Accounting & Finance
- Axim aut as excepu
- dita poribusi, volup
- tat alitatur sunt fugit
- invenis doluptate

BizEmpire Resources
Valuation Tool
Reports
Apps
BizEmpire Listings

BizEmpire Links
About BizEmpire
Contact Us
Help
News

Keep up with BizEmpire
Email Address  [Subscribe]

BIZ|EMPIRE - [MFH] company

Aquis alit dolenimus sequibus il ea vel modi corepernam cuptus di
Sed ut expliqui officae consequam res moluptate landitibus que aut
mi, ut assimint rectur?

Home | Sitemap | Use Terms | Privacy Stmnt | Advertise Policy
© 2010 Mentreprenuers Fanagement Hroup

HOME    VALUATION TOOL    ABOUT BIZEMPIRE                                    Help  Contact

BIZ|EMPIRE
*What's Your Empire Worth?*

Estimated Value
$34,6888

| GET STARTED | COMPANY PROFILE | INCOME | ASSETS | GROWTH | OPERATIONS | PRESENCE | FINISH UP |

Step 2 Company Profile
Now please provide some basic information about your business. (* Required)

Address 1 [ie. 55 Main Street]          Select Form of Ownership *

Address 2                                Public or Private

Zip Code *    Select State *             No of Employees    Year of Inception

◀ Back          Save & Continue ▲                              ▲ Questions? *How can we help?*

BizEmpire Resources     BizEmpire Links        Keep up with BizEmpire
Valuation Tool              About BizEmpire            Email Address           Subscribe
Reports                     Contact Us
Apps                        Help                       BIZ|EMPIRE - [MFH] company
BizEmpire Listings          News                       Aquis alit dolenimus sequibus il ea vel modi corepernam cuptus di
Home | Sitemap | Use Terms | Privacy Stmnt | Advertise Policy    Sed ut expliqui officae consequam res moluptate landitibus que aut
© 2010 Mentreprenuers Fanagement Hroup                 mi, ut assimint rectur?

Financial Snapshot 

| | |
|---|---|
| Estimated fair market value for Beta International Corporation | $301,000 |
| Estimated 2008 Cash Flow | $77,000 |
| Return on Equity (ROE) | 110.30% |
| Customer Concentration<br>3 customers accounting for $75,000 of Revenues or 30% during 2008 | LOW |
| Pretax Income | Below Industry Avg |
| Cash-Flow-to-Revenue Ratio | Above Industry Avg |
| Debt-to-Equity Ratio | Below Industry Avg: 14.71% |

In conclusion, the overall assessment of Beta International Corporation is that its financial position is worse than its industry peers.

Fig. 16

Comparative Analysis 

*This comparative analysis shows how your company's financial condition compares to the industry. Your company has been showing negative growth trends compared to your industry peers.*

Overall, Beta International Corporation under performs other businesses in the industry.

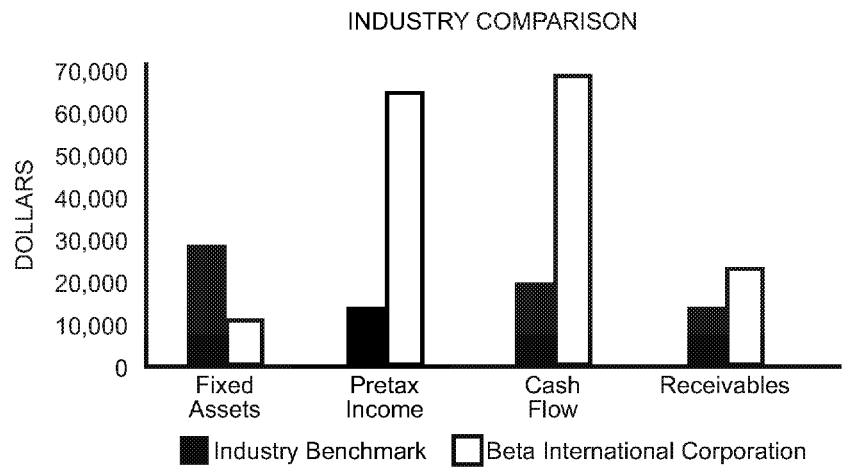

Pretax income and Cash Flow are important for increasing your company's valuations. Thus if there is a gap between your Pretax Income and Cash Flow, and the Industry Average, then there is definitely room for improvement. This may mean enforcing collections, that is, getting paid by your customers more quickly and can be indicated by your Receivables. If your Receivables are higher than the Industry Average, this could be a clue as to why your Pretax Income and Cash Flow are lagging.

Also the Fixed Asset Turnover ratio is another indicator of the efficiency of your assets, which generate Pretax Income and Cash Flow. If there is a gap between you Fixed Asset Turnover and the Industry Average, then you may try to find ways to improve your operations or even replace equipment.

Fig. 17

This report was generated to show the estimated fair market value and estimated liquidation value of the profiled business.

The standard of valuation applied in this case is two-fold. First, the report uses a combination of market and income approaches to estimate the Fair Market Value of the business assuming that it would operate as an ongoing enterprise. Second, the Fair Market Value of Assets and Liabilities was determined to estimate the Liquidation Value the business. For more information on the approaches, please see the 'Assumptions & Approach' section in this report.

For this purpose, Fair Market Value is defined as:

*"...the price that an interested but not desperate buyer would be willing to pay and an interested but not desperate seller would be willing to accept on the open market..."*

The opinion of value given in this report is based on information provided by the user and other sources. This information you input is assumed to be accurate and complete. However, BizEmpire has not audited or attempted to confirm this information for accuracy or completeness.

It's important to note that the above valuations are not final numbers. Instead, we are looking at general estimates. As a result, the overall valuation should be a frame of reference, not an official appraisal.

This report should not be used to obtain credit for any other commercial purposes. The information provided herein is provided for your internal use only and may not be copied or redistributed for any reason. This information is provided 'as is' and without warranty of any kind. BizEmpire does not represent or endorse the accuracy or reliability of the information herein and you acknowledge that any reliance upon this information is at your sole risk. By performing this estimation and generating this report, neither BizEmpire, nor any of its affiliates, officers, directors, employees, agents, or contractors, is to be required to give expert testimony or to be in court, in any other legal proceeding, or at any government hearing with reference to the matters contained herein.

Fig. 18

1. Fair Market Value of Your Company (Business Value)
*Assuming that it would operate as an ongoing enterprise.*

Essentially, our focus is to try to provide the bes approach for small businesses. So, we include a meld of the following:

▲ Market Approach: This involves analyzing the recent Sales of comparable businesses. In a way, this is similar to how a residential real estate is valued.

▲ Income Approach: With this, you forecast future Income and then find the present value of these streams.

▲ Rules-of-Thumb: These are simple valuation methods that are often used by financial advisors.

> Based on all this, we have the following three valuations for your firm:
>
> Optimistic: If you think that this specific business will outperform the local industry.
>
> Expected: This is the most likely value of your business.
>
> Pessimistic: Applicable if you think that this business will face unexpected difficulties.

2. Fair Market Value of the Assets and Liabilities (Liquidation Value)
*Owned by the company assuming that the company would get liquidated*

The Liquidation Value of the business presented in this report assumes that the company will no longer continue to operate. In this case, it's required to wind down and liquidate the company. The Liquidation Value is based on the information you provided on he market values of your company's Fixed Assets and Total Debt.

However, when a company closes down, it can be difficult to get good values when selling Assets. The Liquidation Value in his report attempts to takes this into account.

Fig. 19

Beta International Corporation

| | |
|---|---|
| Business Location: | 110 Main Street<br>Suite 102<br>Philadelphia, PA 19100 |
| Business Industry | Wired Telecommunications |
| Operational Period: | 3 years |
| Operations Assessment: | Very vulnerable to departure of owner<br>Low concentration of sales.<br>3 Customers accounting for $75,000 or 30% of sales |

Fig. 20

Based on your inputs, we have computed the following estimated valuations:

| | |
|---|---:|
| Expected Business Valuation:<br>The expected Business Valuation is the most likely estimated value of this business. | $301,807 |

Optimistic Business Value:
The Optimistic Business Value is the most likely estimated value of this business if you believe it will outperform the local industry.     $331,988

Pessimistic Business Value:
The Pessimistic Business Value is the most likely estimated value of this business if it were to face unexpected difficulties.     $211,267

Liquidation Business Value:
The Liquidation Business Value is based on the information you provided on the market value of your business's Fixed Assets and Total Debt.     $63,050

Fig. 21

Estimated fair market value for
Beta International Corporation　　　　$301,000

| | |
|---|---:|
| Estimated 2008 Cash Flow | $77,000 |
| Return on Equity (ROE) | 110.30% |
| Customer Concentration<br>3 customers accounting for $75,000 of Revenues or 30% during 2008 | LOW |
| Pretax Income | Below Industry Avg |
| Cash-Flow-to-Revenue Ratio | Above Industry Avg |
| Debt-to-Equity Ratio | Below Industry Avg:<br>14.71% |

In conclusion, the overall assessment of Beta International Corporation is that its financial position is worse than its industry peers.

Fig. 22

Income

|  | 2009 | 2008 | 2007 |
|---|---|---|---|
| Revenue | $250,000.00 | $180,000.00 | $130,000.00 |
| Pretax Income | $75,000.00 | $45,000.00 | $25,000.00 |
| Interest Expense | $18,000.00 | $15,000.00 | $12,000.00 |
| Owner Salary | $70,000.00 | $68,000.00 | $65,000.00 |
| Owner Benefits/Perks | $1,500.00 | $1,200.00 | $1,000.00 |

Assets

|  | 2009 | 2008 | 2007 |
|---|---|---|---|
| Cash | $35,000.00 | $32,000.00 | $28,000.00 |
| Account Receivables | $23,000.00 | $21,000.00 | $19,000.00 |
| Inventory | $15,000.00 | $15,000.00 | $13,000.00 |
| Fixed Assets | $10,000.00 | $11,000.00 | $8,000.00 |
| General Depreciation | $5,000.00 | $5,500.00 | $6,800.00 |
| Total Debt | $10,000.00 | $8,000.00 | $9,000.00 |

Fig. 23

|  | Under-Performing | Average | Out-Performing |
|---|---|---|---|
| Cash Flow/Revenue |  |  | X |
| Cash/Revenue |  |  | X |
| Receivables (Conversion) | X |  |  |
| Inventory/Revenue |  |  | X |
| Fixed Assets/Revenue | X |  |  |
| Total Debt/Revenue | X |  |  |

| | Under-Performing | Average | Out-Performing |
|---|---|---|---|
| Receivables/Pretax Income | X | | |
| Inventory/Pretax Income | X | | |
| Fixed Assets/Pretax Income | X | | |
| Total Debt/Pretax Income | | X | |

| Sales/Square Feet | | | Indicates the efficiency of how you use your space. | |
|---|---|---|---|---|
| Year | $ | Under-Performing | Average | Out-Performing |
| 2009 | $125.00 | --- | --- | --- |
| 2008 | $90.00 | --- | --- | --- |
| 2007 | $65.00 | --- | --- | --- |

| Interest Coverage | | | Shows how much cushion a company has in paying its interest expenses. | |
|---|---|---|---|---|
| Year | Percentage | Under-Performing | Average | Out-Performing |
| 2009 | 3.17% | X | | |
| 2008 | 2.00% | X | | |
| 2007 | 1.09% | X | | |

Fig. 27

| Inventory Turnover | | | How long it takes to sell inventory on hand. | |
| --- | --- | --- | --- | --- |
| Year | Percentage | Under-Performing | Average | Out-Performing |
| 2009 | 16.67% | X | | |
| 2008 | 12.00% | X | | |
| 2007 | 10.00% | X | | |

| Fixed Assets Turnover | | | Shows how productive a company's assets are. | |
| --- | --- | --- | --- | --- |
| Year | Percentage | Under-Performing | Average | Out-Performing |
| 2009 | 25.00% | | | X |
| 2008 | 16.37% | | | X |
| 2007 | 16.25% | | | X |

| Receivables (Conversion) | | | Increases over time could signal difficulty in collecting from its customers. | |
| --- | --- | --- | --- | --- |
| Year | Percentage | Under-Performing | Average | Out-Performing |
| 2009 | 10.87% | X | | |
| 2008 | 8.58% | X | | |
| 2007 | 6.85% | X | | |

Fig. 28

| ROE | | | Compares probability to the equity value of a company. Indication of the strength of the business model. | |
|---|---|---|---|---|
| Year | Percentage | Under-Performing | Average | Out-Performing |
| 2009 | 110.30% | | X | |
| 2008 | 68.71% | | | X |
| 2007 | 47.90% | | | X |

| Debt/Equity | | | Shows the extent of the debt load, in comparison to a company's equity value. | |
|---|---|---|---|---|
| Year | Percentage | Under-Performing | Average | Out-Performing |
| 2009 | 14.71% | X | | |
| 2008 | 12.22% | X | | |
| 2007 | 17.25% | X | | |

| Cash/Debt | | | | Shows the ability to pay off existing debts. |
|---|---|---|---|---|
| Year | Percentage | Under-Performing | Average | Out-Performing |
| 2009 | 350.00% | | | X |
| 2008 | 400.00% | | | X |
| 2007 | 311.12% | | | X |

Fig. 29

| Pretax Income/Revenue | | | | A rising percentage will often lead to a higher valuation. |
|---|---|---|---|---|
| Year | Percentage | Under-Performing | Average | Out-Performing |
| 2009 | 30.00% | | | X |
| 2008 | 25.00% | | | X |
| 2007 | 19.24% | | | X |

| Cash Flow/Revenue | | | | A rising percentage will often lead to a higher valuation. |
|---|---|---|---|---|
| Year | Percentage | Under-Performing | Average | Out-Performing |
| 2009 | 30.80% | | | X |
| 2008 | 26.23% | X | | |
| 2007 | 19.85% | X | | |

| Rent/Revenue | | | | This should remain stable over time. |
|---|---|---|---|---|
| Year | Percentage | Under-Performing | Average | Out-Performing |
| 2009 | 7.20% | --- | --- | --- |
| 2008 | 10.00% | --- | --- | --- |
| 2007 | 13.85% | --- | --- | --- |

Fig. 30

Where are you in your journey?

We trust that you have found the BizEmpire Valuation Tool to be an informative resource. Our aim is to provide guidance for growing companies as they evolve and take steps to elevate their performance and results.

No matter where you may be today, we can probably help you get closet to your vision:

- If you're in the early stages of your company's life, perhaps you need to expand your capabilities and reach via marketing, intellectual property advisory, benefits and tax consulting.

- If your business is established and nearing a turning point, maybe you seek legal representation, strategic partners, and/or growth funding.

- If the company is already a substantial success with a critical mass of business, we can help you formulate and/or pursue a smart exit strategy.

If you have more specific questions and feel our experience and network may be of value, please submit your contact information to start a dialogue with our BizEmpire Solutions Team.

Fig. 31

ENGINE, SYSTEM AND METHOD OF PROVIDING BUSINESS VALUATION AND DATABASE SERVICES USING ALTERNATIVE PAYMENT ARRANGEMENTS

CROSS-REFERENCE TO RELATED APPLICATION

This application claims priority to U.S. Provisional Patent Application Ser. No. 61/547,182, filed Oct. 14, 2011, entitled Engine, System and Method for Providing Business Valuation and Database Services Using Alternative Payment Arrangements, and to U.S. Provisional Patent Application Ser. No. 61/493,647, filed Jun. 6, 2011, entitled Engine, System and Method of Providing Cloud-Based Business Valuation and Associated Services, the entireties of which are expressly incorporated herein by reference.

BACKGROUND

1. Field of the Invention

The present invention relates to the financial aspects associated with a business, and, more particularly, to an engine, system and method of providing cloud-based business valuation and associated services.

2. Background of the Invention

There are over 30 million small businesses in the U.S., and over 200 million small businesses globally. These small businesses may be severely limited by a lack of knowledge regarding their respective businesses and the assets thereof. Over 85% of the small businesses that ultimately request a valuation to address these limitations do so in an effort to buy or sell a business, or to obtain financing and/or investment. Moreover, as the availability of investment monies, business loans and government grants has decreased due to a worsening in the economy, an ability to assess and reasonably present a valid valuation to the sources of such monies, grants and loans has become an absolute necessity.

This limitation on small businesses may create a ripple effect that affects other businesses. For example, retail banking entities may have difficulty increasing the numbers of or performance of small business loans; accountants may have difficulty servicing small businesses and deriving revenue therefrom; government grant issuers may have difficulty assessing the quality of prospective grant recipients; insurance agents and financial advisors may have difficulty explaining or assessing proper service levels for owners or principals of small businesses; large businesses may have difficulty assessing target acquisitions or quality partners; and legal professionals and similar service providers may have difficulty assessing quality clientele on which to focus services. As such, there exists an urgent need to generate leads and/or guidance for financiers, business brokers, service providers, service agents, and the like.

Web 2.0 applications are those applications that facilitate interactive information sharing, interoperability, collaboration, and ease of use for offerings on the World Wide Web (WWW, also referred to as the Internet or a network). Web 2.0 thus provides an environment in which may be addressed the aforementioned chilling effect of the lack of understanding of, in particular, small business valuation on the transaction flow across the afore-discussed business parties. However, to date, web 2.0 technology has not been provided that addresses this lack of understanding in a uniform, easy-to-use manner, and that thereby remedies the chilling effect that this lack of understanding has on transaction flow.

Thus, there exists a need for an engine, system and method that provides an easy-to-use, highly valid, cloud-based business valuation, and that additionally provides relevant services typically associated therewith.

SUMMARY

The present invention includes at least a computer-implemented engine, system and method for generating business valuations, scoring, and/or flagging over a network, responsively to information input by a user remote from the engine, system and method. The present invention may include a graphical user interface capable of locally querying a user to input the company information, which may comprise at least general company information, company financial information, and company presence information.

The engine, system and method may additionally include at least one network port capable of remotely receiving the company information from the graphical user interface. The invention may further include at least one engine communicatively connected to the at least one network port, which engine preferably includes a plurality of rules to generate, responsively to the input company information, at least one of a business valuation, a business score, and/or one or more business flags to be used as indicators in a network marketplace, for the company associated with the inputted company information.

Thus, the present invention provides an engine, system and method that provides an easy-to-use, highly valid, cloud-based business valuation, and the relevant services typically associated therewith. It is to be understood that both the foregoing general description and the following detailed description are exemplary and explanatory, and are intended to provide further explanation of the invention as discussed hereinthroughout.

BRIEF DESCRIPTION OF THE DRAWINGS

The accompanying drawings are included to provide a further understanding of the disclosed embodiments. In the drawings, like numerals represent like elements, and:

FIG. 3 illustrates an aspect of an exemplary embodiment of the present invention;

FIG. 7 illustrates an aspect of an exemplary embodiment of the present invention;

FIG. 8 illustrates an aspect of an exemplary embodiment of the present invention;

FIG. 9 illustrates an aspect of an exemplary embodiment of the present invention;

FIG. 10 illustrates an aspect of an exemplary embodiment of the present invention;

FIG. 11 illustrates an aspect of an exemplary embodiment of the present invention;

FIG. 12 illustrates an aspect of an exemplary embodiment of the present invention;

FIG. 13 illustrates an aspect of an exemplary embodiment of the present invention;

FIG. 14 illustrates an aspect of an exemplary embodiment of the present invention;

FIG. 16 illustrates an aspect of an exemplary embodiment of the present invention;

FIG. 17 illustrates an aspect of an exemplary embodiment of the present invention;

FIG. 18 illustrates an aspect of an exemplary embodiment of the present invention;

FIG. 19 illustrates an aspect of an exemplary embodiment of the present invention;

FIG. 20 illustrates an aspect of an exemplary embodiment of the present invention;

FIG. 21 illustrates an aspect of an exemplary embodiment of the present invention;

FIG. 22 illustrates an aspect of an exemplary embodiment of the present invention;

FIG. 23 illustrates an aspect of an exemplary embodiment of the present invention;

FIG. 27 illustrates an aspect of an exemplary embodiment of the present invention;

FIG. 28 illustrates an aspect of an exemplary embodiment of the present invention;

FIG. 29 illustrates an aspect of an exemplary embodiment of the present invention;

FIG. 30 illustrates an aspect of an exemplary embodiment of the present invention;

FIG. 31 illustrates an aspect of an exemplary embodiment of the present invention;

DETAILED DESCRIPTION

Computer-implemented platforms, engines, systems and methods of use are disclosed that provide networked access to a plurality of types of digital content, including but not limited to video, audio, metadata, interactive and document content, and that track, deliver manipulate, transform and report the accessed content. Described embodiments of these platforms, engines, systems and methods are intended to be exemplary and not limiting. As such, it is contemplated that the herein described systems and methods can be adapted to provide many types of cloud-based valuations, scoring, marketplaces, and the like, and can be extended to provide enhancements and/or additions to the exemplary platforms, engines, systems and methods described. The invention is thus intended to include all such extensions. Reference will now be made in detail to various exemplary and illustrative embodiments of the present invention.

Figure 1:
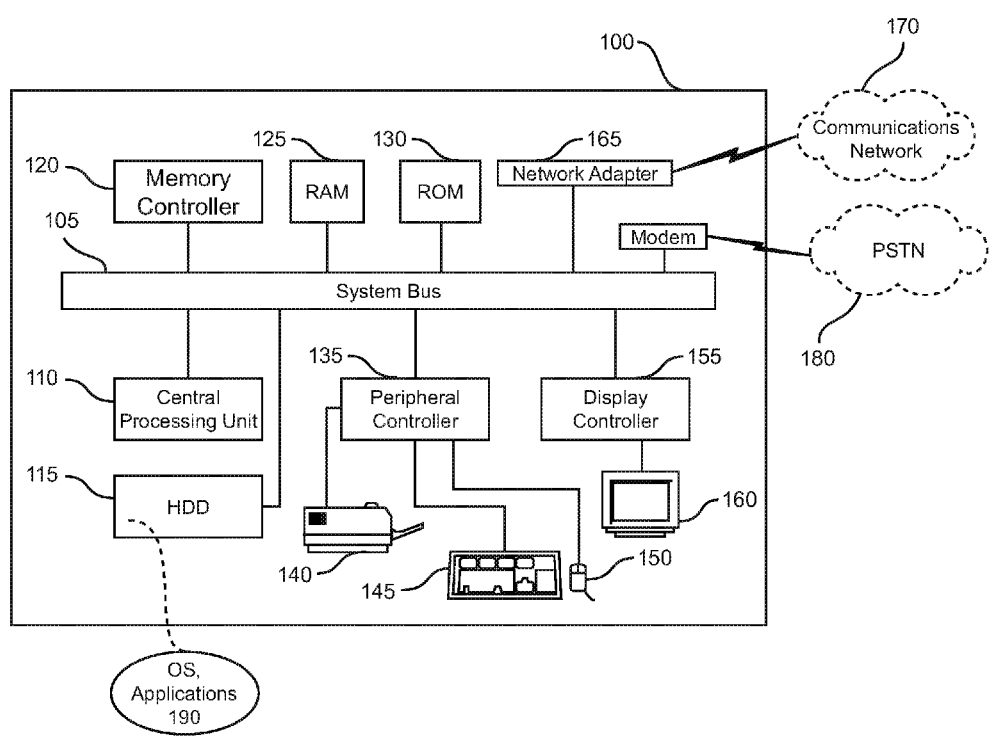
FIG. 1 illustrates an aspect of an exemplary embodiment of the present invention.

FIG. 1 depicts an exemplary computing system 100 for use in accordance with herein described system and methods. Computing system 100 is capable of executing software, such as an operating system (OS) and a variety of computing applications 190. The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, and the like, CPU 110 is implemented in an integrated circuit called a processor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium such as HDD 115. Such instructions can be included in software such as an operating system (OS), executable programs, and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing processors and support chips.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is the Peripheral Component Interconnect (PCI) bus.

Display 160, which is controlled by display controller 155, can be used to display visual output and/or presentation generated by or at the request of computing system 100. Such visual output may include text, graphics, animated graphics, and/or video, for example. Display 160 may be implemented with a CRT-based video display, an LCD-based flat-panel display, gas plasma-based flat-panel display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet. Communications network 170 may provide user access for computing system 100 with means of communicating and transferring software and information electronically. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used.

It is appreciated that exemplary computing system 100 is merely illustrative of a computing environment in which the herein described systems and methods may operate and does not limit the implementation of the herein described systems and methods in computing environments having differing components and configurations, as the inventive concepts described herein may be implemented in various computing environments using various components and configurations.

Figure 2:
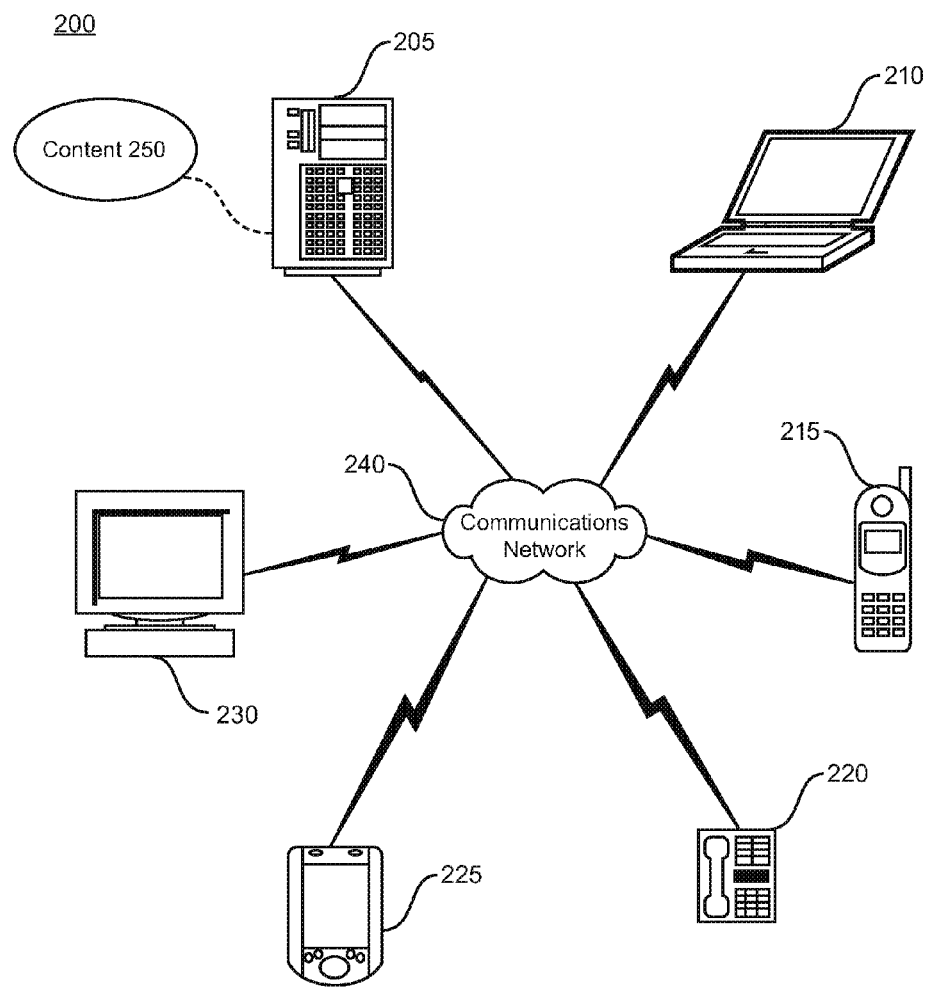
FIG. 2 illustrates an aspect of an exemplary embodiment of the present invention.

As shown in FIG. 2, computing system 100 can be deployed in networked computing environment 200. In general, the above description for computing system 100 applies to server, client, and peer computers deployed in a networked environment, for example, server 205, laptop computer 210, and desktop computer 230. FIG. 2 illustrates an exemplary illustrative networked computing environment 200, with a server in communication with client computing and/or communicating devices via a communications network, in which the herein described apparatus and methods may be employed.

As shown in FIG. 2, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or the like, to interact with server 205.

The present invention is a web 2.0 online, thin client service that provides cloud-based business valuations and associated services, and that may additionally provide intellectual property and prospective business valuations and associated services. The present invention includes a networked engine, system and method that may provide the valuations, and that may additionally provide the equivalent of a FICO credit score for business, flagging to provide a marketplace for business seeking investors and acquirers, and various other services.

The present invention may preferably provide a simple process with a limited number of interactive steps posing queries to a requesting user, such as between 3 and 7 steps, preferably 7 steps, or between 3 and 10 steps, for example. The steps are designed to use basic, yet key factors known or readily available to the requesting user, as input to the rules engine of the present invention. Key factors may or may not incorporate networked and/or third party information as additional input, to provide a multi-tiered, highly valid estimate of business value. This valuation may be, for example, for a prospective business or prospective line of business, for a current business or current line of business, and/or for the intellectual property of a business as that intellectual property contributes to business value.

In a preferred embodiment, an electronic and/or written valuation report may be provided to a user as output from the engine, and responsive to the inputs to the engine. Such a report may be provided via thin client, thick client, mobile app, widget, or the like, and is preferably provided as software as a service (SaaS), by way of non-limiting example. As such, the presentation of the present invention provided to a requesting user, as discussed further herein, may likewise be provided as a thin-client, a thick client app, an app, a mobile app, a widget, or the like.

A report according to the present invention may preferably set forth the value estimates, and in addition may set forth detailed support for the value estimates, and as such the report may be an abbreviated report of valuation, or a detailed report of valuation. As referenced above, such value estimates may be multi-tiered, preferably incorporate at least the information entered at the aforementioned steps, and may additionally incorporate networked, locally stored, and/or third party information.

The present invention may focus on small to midsize businesses for the valuation and associated services discussed herein, as such an area has the greatest need for the services provided by the present invention. However, the present invention may additionally have applicability for all parties in a transactional flow, such as larger businesses, wherein the larger businesses may or may not be seeking to acquire the valued-smaller business, and such as those offering loans, grants, and services, such as insurance, accounting or legal services. As such, all parties in a business-related transactional flow may benefit from the convenience, speed, accuracy, validity, and low cost of valuations and associated services provided by the rules engine of the present invention responsive to the requesting user and/or third-party information inputs.

The easy-to-use, thin client user interface (UI) provided by the presentation layer of the present invention may provide, for example, an optimized interface that may not only increase convenience, speed, accuracy, validity and cost-effectiveness of valuations, but that may additionally enhance conversion rates, increase visitor-ship, and increase search rankings. Further, an optimized UI may provide advertisements that may be targeted based on, for example, stored/tracked profile information and/or information entered responsive to the aforementioned query steps. More highly targeted ads are, of course, increasingly valuable as the targeted audience may be narrowed.

Figure 4:
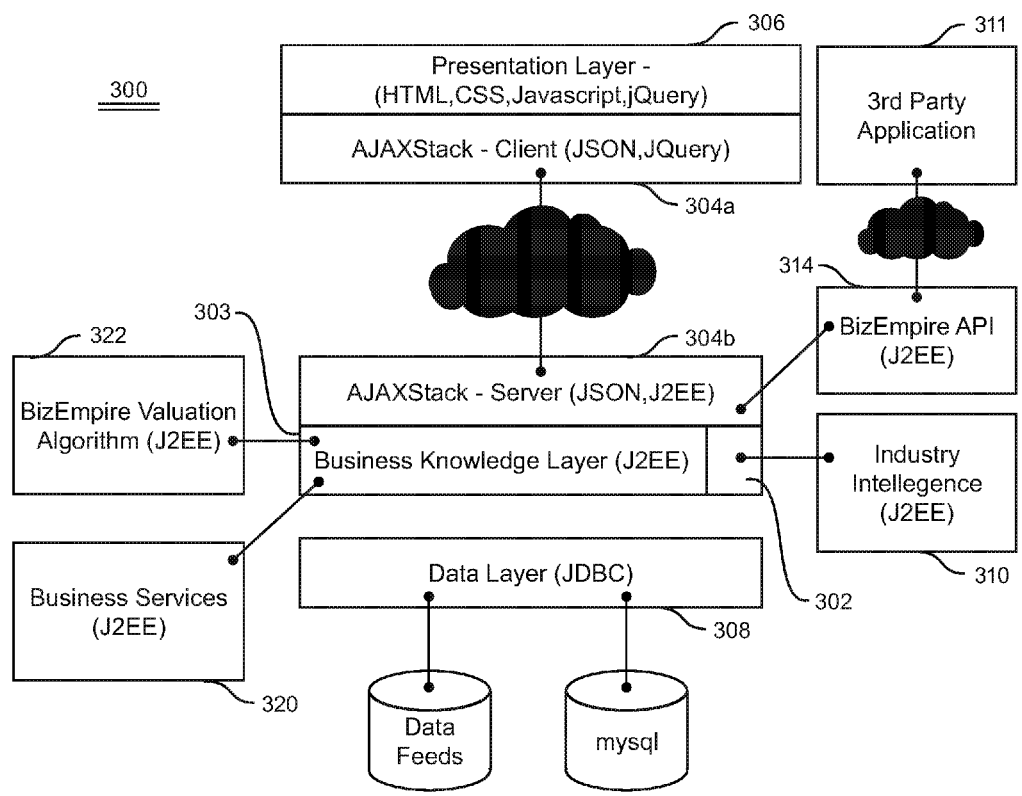
FIG. 4 illustrates an aspect of an exemplary embodiment of the present invention.

Yet further, tools/apps may be provided in a thin client interface, such as from engine 302 via the presentation layer as illustrated in FIG. 4, to enhance visitorship and time spent on the site, which may further enhance advertising revenues. By way of non-limiting example, FIG. 3 illustrates a number of tools/apps that may be thus provided. Such tools may include, for example, legal or accounting services, marketing assistance, capital management, staffing or payroll management, and/or accounting and finance.

The engine, system and method discussed hereinthroughout may be provided, by way of non-limiting example, by the exemplary system 300 infrastructure illustrated in FIG. 4. In the illustrated embodiment, the system 300 may include an engine 302 for performing the aspects discussed herein, shown as resident in the business knowledge layer 303. The engine 302 may be comprised of computing software that executes a set of rules that function to generate the aspects discussed herein, and hardware necessary to execute such computing functions as discussed above with respect to FIGS. 1 and 2.

As discussed herein throughout, the business knowledge layer 303 may be updated in real-time and may access system databases and engine 302 to facilitate access to, accumulation of, and use of such real-time information. As discussed herein, once access is provide, the present invention may query known location of information to provide for automatic updates. For example, previous access to IRS records provided by the company may allow the present invention to query IRS records on a real-time or periodic basis to keep such information updated. Further, a web crawler, as is known to those skilled in the art, may be used to search and gather information such a news related to the company or related companies, such as an investor company. The information gathered by the web crawler may be parsed and valued. For example, the present invention may interpret a news feed in which a rating agency downgrades the company via engine 302 into a negative value contribution to the company's overall valuation.

Figure 5:
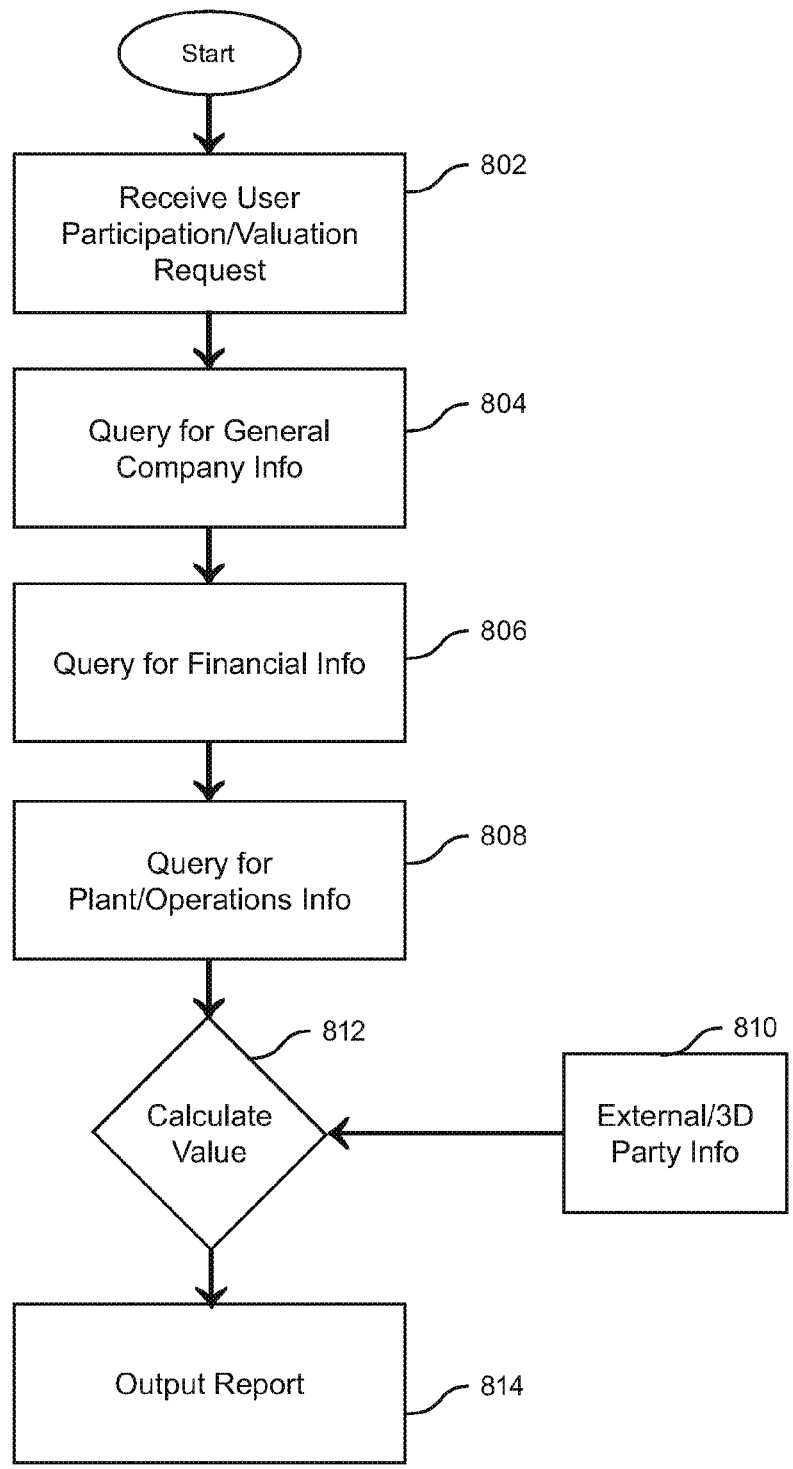
FIG. 5 illustrates an aspect of an exemplary embodiment of the present invention.
Figure 6:
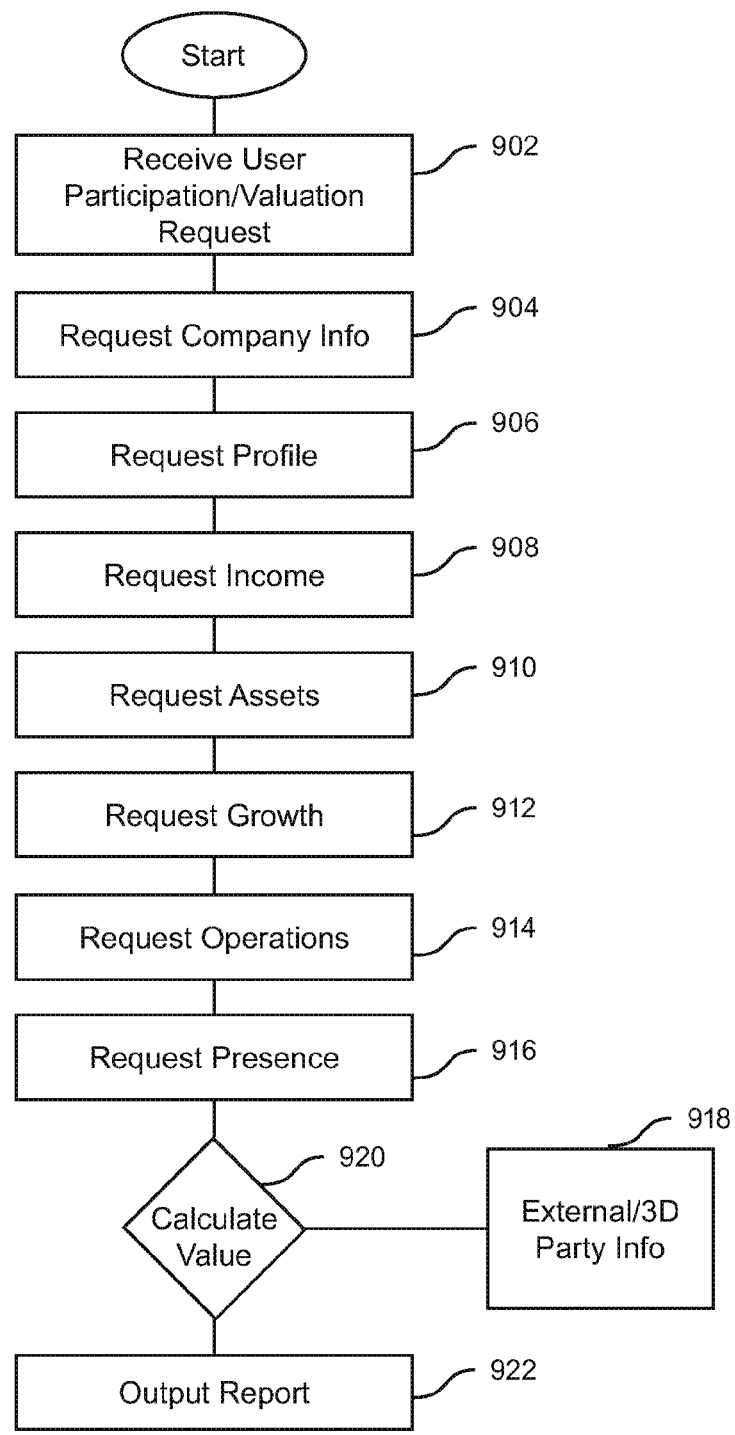
FIG. 6 illustrates an aspect of an exemplary embodiment of the present invention.

Engine 302 may, for example, gather inputs from various sources, most preferably including at least the inputs received from the requesting user responsive to the aforementioned steps, such as the 3 to 10 steps, or more preferably 7 steps, discussed hereinthroughout, to thereby transform the inputs into valuations and associated services as discussed. By way of non-limiting example, FIG. 5 illustrates an exemplary flow of a 3 step query process according to the present invention. FIG. 6 illustrates an exemplary flow of a 7 step process according to the present invention.

The engine 302 may be, in a preferred embodiment, a rules engine embedded in the business knowledge layer 303. Typically, a rules engine 302 is defined to include a software component that readily allows for the addition of or changes to business logic in a process management system. A business rule is a computing statement that uses business logic to describe a policy, procedure or calculation. Business logic describes the sequence of operations that may be associated with data in a database to carry out the applicable business rule.

Databases compatible for use with the present invention may include an open source, high-performance, schema-free, document-oriented database, such as, for example, a Mongo-based database. Such a database may be document-oriented and may allow for the management of JSON-like documents, as discussed herein below. The use of such a database with the present invention may allow the accessing of data in the present invention in a more natural way, as data may be nested in complex hierarchies but still be query-able and indexable.

For example, such a database may allow for consistent UTF-8 encoding, wherein certain non-UTF-8 data may be saved, queried, and retrieved with a special binary data type. The database may also be supported and accessed by systems using Windows, Linux, OS X, and Solaris, and may allow for type-rich code, such as, for example, supports dates, regular expressions, code, binary data, and the like (all BSON types).

Also useful in the present invention may be functionality allowing various fields to be queried at any given time and within information containing arrays and other nested fields. Such queries may return specific fields of information/documents (instead of the entire field of related data), as well as having the capability of sorting, skipping, and limiting results. Queries may also include user-defined JavaScript functions (if the function returns true, the document matches).

A rules engine generally separates execution code for the rules from the rest of process management. Thus, when a change is made to a rule or rules, the rules engine may evaluate the change's effect on other rules and flag any conflict without effecting the remainder of the processes. A rules engine may include a rule repository, such as a database, for storing the rules, a rule editor, such as a user interface, that allows users to define, design, document and edit the rules, a reporting component that allows users to query and report existing rules, and a rules engine execution core, which is comprised of the programming code that enforces the rules.

Function calls for engine 302 may be made to the AJAX stack 304a, b, which may be provided server side for local engine 302 calls and client side for remote calls, as illustrated. Client side presentation may be made via the presentation layer 306, as illustrated, and client-side information may be requested and received thereby. The data layer 308 may receive various data feeds, and may store additional data, wherein such data may be received from the network, such as from the Internet cloud. Such data may be gained, for example, via directed search, spider or crawl search, data streaming, or the like. Such data may include, by way of non-limiting example, third party reporting (such as Dunn & Bradstreet, by way of non-limiting example), searching for positive or negative references to the entity being valuated, industry specific information, intellectual property information, taxation or public financial information, or the like.

Data in data layer 308 may additionally include, for example, a repository of educational information for requesting users, such as information regarding taking on investment for requesting users that indicate the requested valuation is made because investment is sought. For example, electronic guides may thus be provided and stored as system data, such as guides regarding buying and selling businesses, obtaining loans, grants, and investment, writing a business plan or investor presentation, or the like.

Likewise, industry intelligence may be accumulated at block 310. Such industry intelligence may be gained via the cloud, and additionally may be gained by the engine 302 based on the repeated running of valuations by engine 302. Industry intelligence may include monitoring of a website provided via the presentation layer 306. Such monitoring may include, for example, traffic monitoring, user feedback, and the like, and may additionally include, such as via the third party application interface 311 reached from engine 302, the use of third party monitoring, such as Google Analytics, Kampyle, Bizo, Clicktale, and the like. Industry intelligence may be accumulated by, for example, industry sector or customer type (i.e., licensee, individual, etc.).

Information may be provided to the API 314, for ultimate use by engine 302, by any of a variety of feeds, such as via the cloud. Therefore, information may be gained from a third party, such as via a search or the like. Information may further pass, for example, from third party applications (such as may be provided by credit agencies, Dunn & Bradstreet, governmental agencies, or the like) through the API 314 to the engine 302.

Key elements provided by engine 302 in the business knowledge layer may include the services 320 provided via application of the valuation criteria 322. The services 320 may include, for example, straight valuation based on the criteria 322 as applied to the information provided via the data layer 308, via third party applications and API 314, via industry intelligence 310 and via client-side 306. Services 320 may further include flagging, as discussed hereinbelow, to indicate a prospective investor, or other small business or large business statuses, for example, for indication to the business knowledge layer comprising engine 302. Yet further, services 320 may include a financial health or similar scoring, as also discussed hereinbelow, such as may be calculated pursuant to criteria 322 based on at least entered data, such as those data used to calculate the valuation service as referenced above.

The valuation service 322 may include, for example, the provision of a valuation report using only minimal information provided by the requesting user. Such a valuation report may additionally be generated using access to outside/third party information and databases. Further, the system 300 may allow for the use of the databases at the data layer 308 to securely store, and reproduce upon request, all valuations and/or scores generated. Thereby, valuation reports may be modified and/or updated, and such modification may occur periodically.

In an exemplary embodiment, the requesting user may receive a recommendation, such as via presentation layer 306, to return periodically to update a valuation, and/or to receive a modified valuation responsive to, for example, a change in the circumstances of the requesting business, or a change in a respective industry as indicated by the external information originally used in the initial valuation. By way of non-limiting example, a significant paradigm shift, such as the recent proliferation of tablet computers, might cause all parties that had requested valuations and that fall in verticals associated with tablet computers to receive an invitation to revisit an earlier valuation.

In an exemplary embodiment of a simple valuation in accordance with valuation service 322, engine 302 may perform numerous steps to arrive at the simple valuation. The engine may calculate a function for the year-weighted average of certain variables for which a value is collected for three years, such as revenue, pretax income, inventory and the like. This function is herein denoted as w(y1, y2, y3), where y1 is the value of the subject variable for the most recent year (i.e. 2010), y2 is the value for the previous year (i.e. 2009), and y3 is the value for the year before that (i.e. 2008). The function w(y1, y2, y3) may be calculated as follows:

If variable y1 (recent year) is not provided, then the average is 0.

Else, if y1 is provided then:
  If y1 is the only provided year, (and y2 and y3 are not provided), then average is y1 itself;

Else, if y1 and y2 are provided (and y3 is not), the average is:

$$(y1 \times 0.7) + (y2 \times 0.3);$$

Else, if y1 and y3 are provided (and y2 is not), the average is:

$$(y1 \times 0.7) + (y3 \times 0.3);$$

And finally, if y1, y2 and y3 are provided, the average is:

$$(y1 \times 0.5) + (y2 \times 0.33) + (y3 \times 0.17).$$

The function w(var) is used to denote the year-weighted average function for the subject variable, var, over the three years—that is, w(inventory) is equivalent to w(inventoryY1, inventoryY2, inventoryY3).

The engine 302 may calculate a valuation multiplier as dependent on an industryMultiplier and a growthMultiplier. The industryMultiplier may be looked up externally by engine 302, such as by NAICS code. The growthMultiplier may be looked up by revenueGrowth and ebitdaMargin, such as by using a table similar to the example illustrated in Table 1.

TABLE 1

| | | Long Term EBITDA Margin | | | | | | | | | | |
|---|---|---|---|---|---|---|---|---|---|---|---|---|
| | | 5% | 10% | 15% | 20% | 25% | 30% | 35% | 40% | 45% | 50% | 55% |
| Projected Revenue | 5% | 0.3 | 0.7 | 1 | 1.3 | 1.6 | 2 | 2.3 | 2.6 | 2.9 | 3.3 | 3.6 |
| | 10% | 0.4 | 0.8 | 1.2 | 1.6 | 2 | 2.4 | 2.8 | 3.2 | 3.6 | 4 | 4.3 |
| | 15% | 0.5 | 1 | 1.4 | 1.9 | 2.4 | 2.9 | 3.4 | 3.8 | 4.3 | 4.8 | 5.1 |
| | 20% | 0.6 | 1.1 | 1.7 | 2.2 | 2.8 | 3.3 | 3.9 | 4.5 | 5 | 5.6 | 5.9 |
| | 25% | 0.6 | 1.3 | 1.9 | 2.5 | 3.2 | 3.8 | 4.4 | 5.1 | 5.7 | 6.3 | 6.6 |
| | 30% | 0.7 | 1.4 | 2.1 | 2.8 | 3.6 | 4.3 | 5 | 5.7 | 6.4 | 7.1 | 7.4 |
| | 35% | 0.8 | 1.6 | 2.4 | 3.2 | 3.9 | 4.7 | 5.5 | 6.3 | 7.1 | 7.9 | 8.2 |
| | 40% | 0.9 | 1.7 | 2.6 | 3.5 | 4.3 | 5.2 | 6.1 | 6.9 | 7.8 | 8.7 | 9 |
| | 45% | 0.9 | 1.9 | 2.8 | 3.8 | 4.7 | 5.7 | 6.6 | 7.5 | 8.5 | 9.4 | 9.7 |
| | 50% | 1 | 2 | 3.1 | 4.1 | 5.1 | 6.1 | 7.1 | 8.2 | 9.2 | 10.2 | 10.5 |
| | 55% | 1.3 | 2.3 | 3.4 | 4.4 | 5.4 | 6.4 | 7.4 | 8.5 | 9.5 | 10.5 | 10.8 |
| | 60% | 1.6 | 2.6 | 3.7 | 4.7 | 5.7 | 6.7 | 7.7 | 8.8 | 9.8 | 10.8 | 11.1 |
| | 65% | 1.9 | 2.9 | 4 | 5 | 6 | 7 | 8 | 9.1 | 10.1 | 11.1 | 11.4 |
| | 70% | 2.2 | 3.2 | 4.3 | 5.3 | 6.3 | 7.3 | 8.3 | 9.4 | 10.4 | 11.4 | 11.7 |
| | 75% | 2.5 | 3.5 | 4.6 | 5.6 | 6.6 | 7.6 | 8.6 | 9.7 | 10.7 | 11.7 | 12 |
| | 80% | 2.8 | 3.8 | 4.9 | 5.9 | 6.9 | 7.9 | 8.9 | 10 | 11 | 12 | 12.3 |
| | 85% | 3.1 | 4.1 | 5.2 | 6.2 | 7.2 | 8.2 | 9.2 | 10.3 | 11.3 | 12.3 | 12.6 |
| | 90% | 3.4 | 4.4 | 5.5 | 6.5 | 7.5 | 8.5 | 9.5 | 10.6 | 11.6 | 12.6 | 12.9 |
| | 95% | 3.7 | 4.7 | 5.8 | 6.8 | 7.8 | 8.8 | 9.8 | 10.9 | 11.9 | 12.9 | 13.2 |
| | 100% | 4 | 5 | 6.1 | 7.1 | 8.1 | 9.1 | 10.1 | 11.2 | 12.2 | 13.2 | 13.5 |

| Long Term EBITDA Margin | | | | | | | | |
|---|---|---|---|---|---|---|---|---|
| 60% | 65% | 70% | 75% | 80% | 85% | 90% | 95% | 100% |

TABLE 1-continued

| Projected Revenue | | | | | | | | | | |
|---|---|---|---|---|---|---|---|---|---|---|
| 5% | 3.9 | 4.2 | 4.5 | 4.8 | 5.1 | 5.4 | 5.7 | 6 | 6.3 |
| 10% | 4.6 | 4.9 | 5.2 | 5.5 | 5.8 | 6.1 | 6.4 | 6.7 | 7 |
| 15% | 5.4 | 5.7 | 6 | 6.3 | 6.6 | 6.9 | 7.2 | 7.5 | 7.8 |
| 20% | 6.2 | 6.5 | 6.8 | 7.1 | 7.4 | 7.7 | 8 | 8.3 | 8.6 |
| 25% | 6.9 | 7.2 | 7.5 | 7.8 | 8.1 | 8.4 | 8.7 | 9 | 9.3 |
| 30% | 7.7 | 8 | 8.3 | 8.6 | 8.9 | 9.2 | 9.5 | 9.8 | 10.1 |
| 35% | 8.5 | 8.8 | 9.1 | 9.4 | 9.7 | 10 | 10.3 | 10.6 | 10.9 |
| 40% | 9.3 | 9.6 | 9.9 | 10.2 | 10.5 | 10.8 | 11.1 | 11.4 | 11.7 |
| 45% | 10 | 10.3 | 10.6 | 10.9 | 11.2 | 11.5 | 11.8 | 12.1 | 12.4 |
| 50% | 10.8 | 11.1 | 11.4 | 11.7 | 12 | 12.3 | 12.6 | 12.9 | 13.2 |
| 55% | 11.1 | 11.4 | 11.7 | 12 | 12.3 | 12.6 | 12.9 | 13.2 | 13.5 |
| 60% | 11.4 | 11.7 | 12 | 12.3 | 12.6 | 12.9 | 13.2 | 13.5 | 13.8 |
| 65% | 11.7 | 12 | 12.3 | 12.6 | 12.9 | 13.2 | 13.5 | 13.8 | 14.1 |
| 70% | 12 | 12.3 | 12.6 | 12.9 | 13.2 | 13.5 | 13.8 | 14.1 | 14.4 |
| 75% | 12.3 | 12.6 | 12.9 | 13.2 | 13.5 | 13.8 | 14.1 | 14.4 | 14.7 |
| 80% | 12.6 | 12.9 | 13.2 | 13.5 | 13.8 | 14.1 | 14.4 | 14.7 | 15 |
| 85% | 12.9 | 13.2 | 13.5 | 13.8 | 14.1 | 14.4 | 14.7 | 15 | 15.3 |
| 90% | 13.2 | 13.5 | 13.8 | 14.1 | 14.4 | 14.7 | 15 | 15.3 | 15.6 |
| 95% | 13.5 | 13.8 | 14.1 | 14.4 | 14.7 | 15 | 15.3 | 15.6 | 15.9 |
| 100% | 13.8 | 14.1 | 14.4 | 14.7 | 15 | 15.3 | 15.6 | 15.9 | 16.2 |

The actual multiplier may then be calculated as:
If growthMultiplier>industryMultiplier then:

$$\text{multiplier} = \frac{g\_growthMultiplier + industryMultiplier}{2}$$

Else multiplier=industryMultiplier.

Seller's discretionary earnings (SDE) may then be calculated as:
1. Sum the year-weight averages of . . .

$$SDE = w(pretaxIncome)$$
$$\cdot w(ownerSalary)$$
$$\cdot w(ownerBenefits)$$
$$\cdot w(onetimeBenefits)$$
$$\cdot w(noncashItems)$$
$$\cdot w(interestExpense)$$
$$\cdot w(onetimeCosts)$$

2. Adjust to inflation.
3. Adjust to pre-tax growth.

Next, the valuation value may be calculated. The SDE may be multiplied by the selected multiplier, and may have applied thereto a series of industry-specific adjustment factors which may, for example, again be obtained external to system 200 by engine 202:

valuation=SDE×multiplier.

Adjustments may include, for example:
1. Negative vaulation adjustment:
   If valuation≤0, then $$\text{valuation} = \frac{w(\text{revenue}) \times growthMultiplier}{2}$$

2. Adjust to recurring revenue:
3. Adjust to intellectual property:
4. Adjust to percent of sales from top three customers:
5. Adjust to the "if the owner left" impact:
6. If the valuation is negative at this point, it may be reset to 0, or alternative calculation methodologies may be employed by engine 202.
7. Subtract debt for recent year only.
8. Add cash for recent year only.
9. Subtract 50% of depreciation for recent year only.
10. Add fixedAssets for recent year only.
11. Add 80% of accountsreceveivable for recent year only.
12. Add 75% of inventory for recent year only.

Thereby, an exemplary valuation may be obtained. Of course, those skilled in the pertinent arts will appreciate that other calculation means, or adjustments, may be employed by engine 302, and further that certain calculations performed by engine 302 may constitute reportable, standalone calculations that may be output in a report by engine 302. By way of non-limiting example, a specific intellectual property valuation may be performed, either as a stand-alone report or as a part of the aforementioned business valuation. In such an embodiment, each patent or patent application may be assigned a value. For example, a patent's or patent application's value may be calculated as:
1. Assess Patent Office's assigned search fields for the patent/application as percentage values of gross-domestic product ("GDP") (such as may be obtained external to system 200 by engine 202);
2. Assess patent breadth:
   If number of independent claims=1, assign+1;
   If number of independent claims=2 or 3, assign+2;
   If number of independent claims>3, assign+3;
   If at least 1 independent claim has 3 or fewer claim limitations, assign+3;
   If at least 1 independent claim has 5 or fewer claim limitations, assign+2;
3. Assess number of competitors with vertical market share greater than 10% in the assessed area of GDP;
4. Assess patent's/application's value:
   If assigned value=+5 or 6, then value is lesser of 10% of the vertical market share in the assessed area of GDP, or $2.5 million, or alternatively is the average of 10% of the vertical market share and $2.5 million;
   If assigned value=+3 or 4, then value is lesser of 5% of vertical market share or $1 million, or alternatively is the average of 5% of the vertical market share and $1 million;

If assigned value=+1 or 2, then the value may alternately be assigned as $100,000, the cost of pursuing the patent (as entered by the requesting user), or 1% of the vertical market share.

Similarly, a patent's or application's value may be obtained by the engine 302 by gaining information external to system 300, such as via searching at blocks 310 or 314, in relation to other patent properties sold in the field of search, by way of non-limiting example.

Services 320 may additionally include a financial health scoring, for example, as discussed further hereinbelow. A score may be generated for each business participating in the engine 302 of the invention. Such scoring may be automatically generated pursuant to a valuation service, or may be separately generated, such as for a separate or lesser fee from a valuation service. Thereby, normalized across-industry scores for a large number of businesses may allow for expedited comparison, such as by prospective investors or acquirers, between those businesses. The scores may be provided via a simple search interface, and/or a search by industry, location, name, principals, email address, address, reason for valuation, financial information, valuation or score range, combinations thereof or the like.

In a preferred embodiment of the present invention, a B score may be provided in the range of 1-777 (1 being the lowest and 777 being the highest). Such a valuation may be further based on the input of any number of pieces of information, and, more preferably, at least seven (7) pieces of information. Although the pieces of information may be chosen by the company, the information may be in response to specific questions pertaining to the company as generated and posed by the present invention, for example.

The B score discussed herein may be representative of the rating or score given to company and may indicate whether the score is the highest achieved by the company, the highest received by any company, the highest received by a company is a defined category, and/or the lowest score for the foregoing categories, and similarly disposed indicators as would be known to those skilled in the art. Similarly, an icon may be provided to the company for display purposes, both electronic and otherwise, to indicate the company's B score, either in a direct or indirect manner.

A B score may be first obtained by a company once the company has inputted at least the company's name and contact information, such as an email address, for example. Such a base line of information may represent the minimum B score that may be issued by the present invention. As discussed above, adding information may allow the B score to rise and may be increased or decreased based on the entered information and/or the actual content of the entered information. By way of example, even if the issuance of additional shares is entered into the present invention, the dilution of shares may negatively impact the overall B score.

In an embodiment of the present invention, a B score of 50 may be awarded to a company for the input of information related to the name of the company and its contact information as discussed above. The score may be raised through adding information such as, for example, revenue growth over a defined period of time (score of 100-200); gross margin (score of 100-200); Recurring revenue (score of up to 75); interest expense ((score of 25 to −50; intellectual property (score of up to 25); profitability (score of up to 200), for example. Although the B score may be generated from just two points of information, in a preferred embodiment, a B score will have at least five points of information.

The searchability of scores may be particularly advantageous if associated with the flagging discussed herein—that is, if a simple search can be performed to find businesses having a particular score or range of scores, and the businesses returned responsive to the search may be broken down by which ones are, for example, seeking investors, the present invention will thereby greatly facilitate the occurrence of investment transactions. Valuations, of course, may be made publicly available in a manner similar to the scores, and may thus likewise be associated with flagging, such as pursuant to permission received from the requesting user to make the valuation and/or scoring publicly accessible.

Further, the listing of business values, status, interests in partners, and the like greatly facilitate business transactions. For example, valuations and/or scoring may be comparatively provided in a transaction for a buyer, a seller, and a combination thereof after acquisition. These comparative values may serve to indicate whether the transaction should occur. Similarly, such comparative values may be readily available to business sellers, brokers, auctioneers, or sellers of distressed assets, such as in order to indicate proper bidding levels for purchase in an auction environment, or reasonable initial bids for purchase, for example.

The presentation layer, AJAX, business knowledge layer, and/or data layer discussed with respect to this FIG. 4 may be, by way of non-limiting example, java based (such as javascript, J2EE, JSON, jquery and JDBC). Database(s) of the present invention may be, for example, mysql and the aforementioned Mongo, and searching may be performed, by way of non-limiting example, via Solr and as otherwise described herein. Additionally, presentation may be made via the presentation layer 306 using html, xml, and CSS, among many others that will be apparent to those skilled in the pertinent arts.

Moreover, the presentation layer may provide the access to engine 302 as, for example, a widget. As used herein, a widget is a stand-alone application comprising embeddable "chunks" of code that can be embedded into third party sites by a user, such as onto a webpage, blog, or profile on a social media site. A widget according to the present invention provides a dynamic web app that may be shared across any websites to which the code chunks may be installed and embedded. Installation may occur, for example, by copying and pasting the embedded code, or widget, into the desired page. Simplistic widget functions may include link counters and advertising banners, and in the present invention may include, for example, providing of the scoring discussed herein pursuant to entry of only limited information by the requesting user. Needless to say, this widget may drive traffic to a base website associated with engine 302, and may additionally create significant value, and drive traffic, for any third party site onto which this widget is placed. The present widget is a downloadable application that looks and acts as a traditional app, but that that is implemented using web technologies such as JavaScript, Flash, HTML and CSS, for example.

Figure 7:
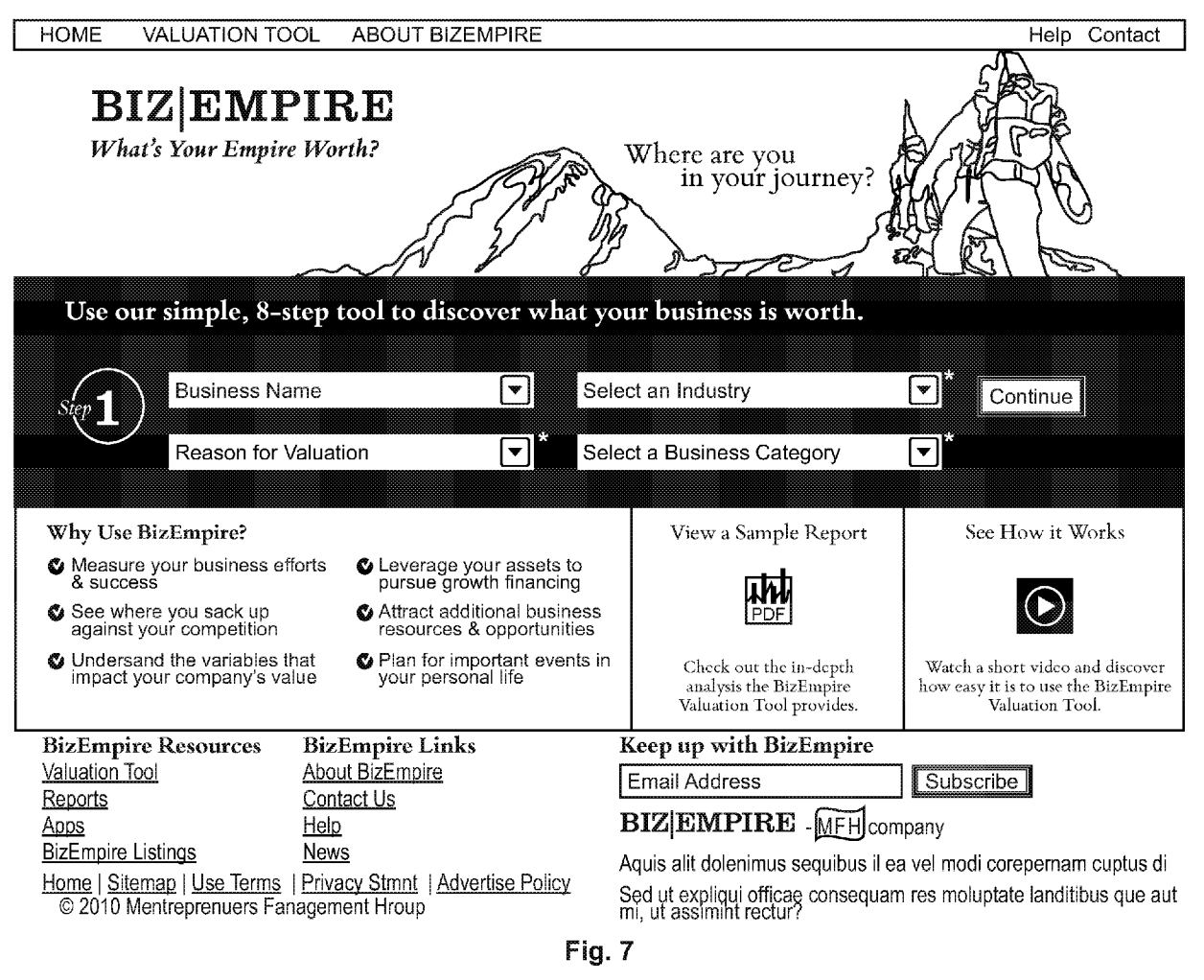

FIG. 7 is an exemplary presentation layer 306 page for an arriving requesting user. As illustrated, the limited steps may be presented, either in a predetermined order or in a grouped or random order, to the requesting user, such as upon login and/or payment and/or completion of entry of account setup information. The query steps may include, for example, the categories of general company information, financial information, and plant and operations information. Thus, the entry of information by the requesting user may be as simple as completing three steps.

FIG. 7 illustrates an exemplary aspect of the general company information step which, as illustrated in FIGS. 7-13, may be the first of between 3 and 7 steps to establish a business valuation by engine 302. As shown, the requesting user may be asked to enter, by way of non-limiting example, the business name, business category, industry and reason for valuation. As discussed herein, this information may be used to provide information regarding the output valuation or scoring via search.

Similarly, FIG. 8 illustrates the entry of general company information, such as address, type of company/ownership, number of employees, years since incorporation, and the like. Needless to say, although the queries related to the general company profile are shown as independent screens for the sake of clarity, and the queries of FIGS. 7 and 8 may be provided separately or in one or more combined steps whereby needed general company information is obtained.

Figure 9:
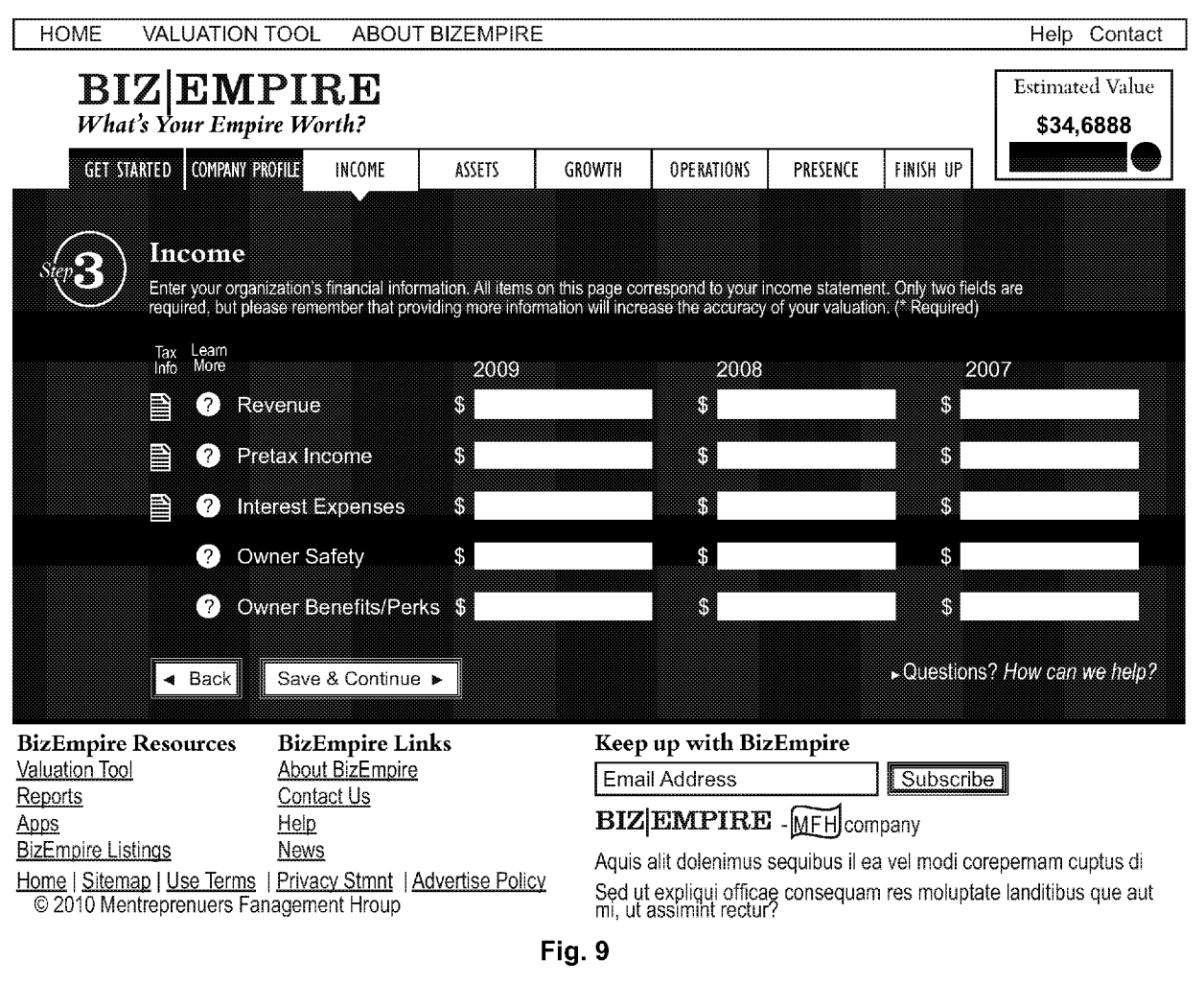
Figure 10:
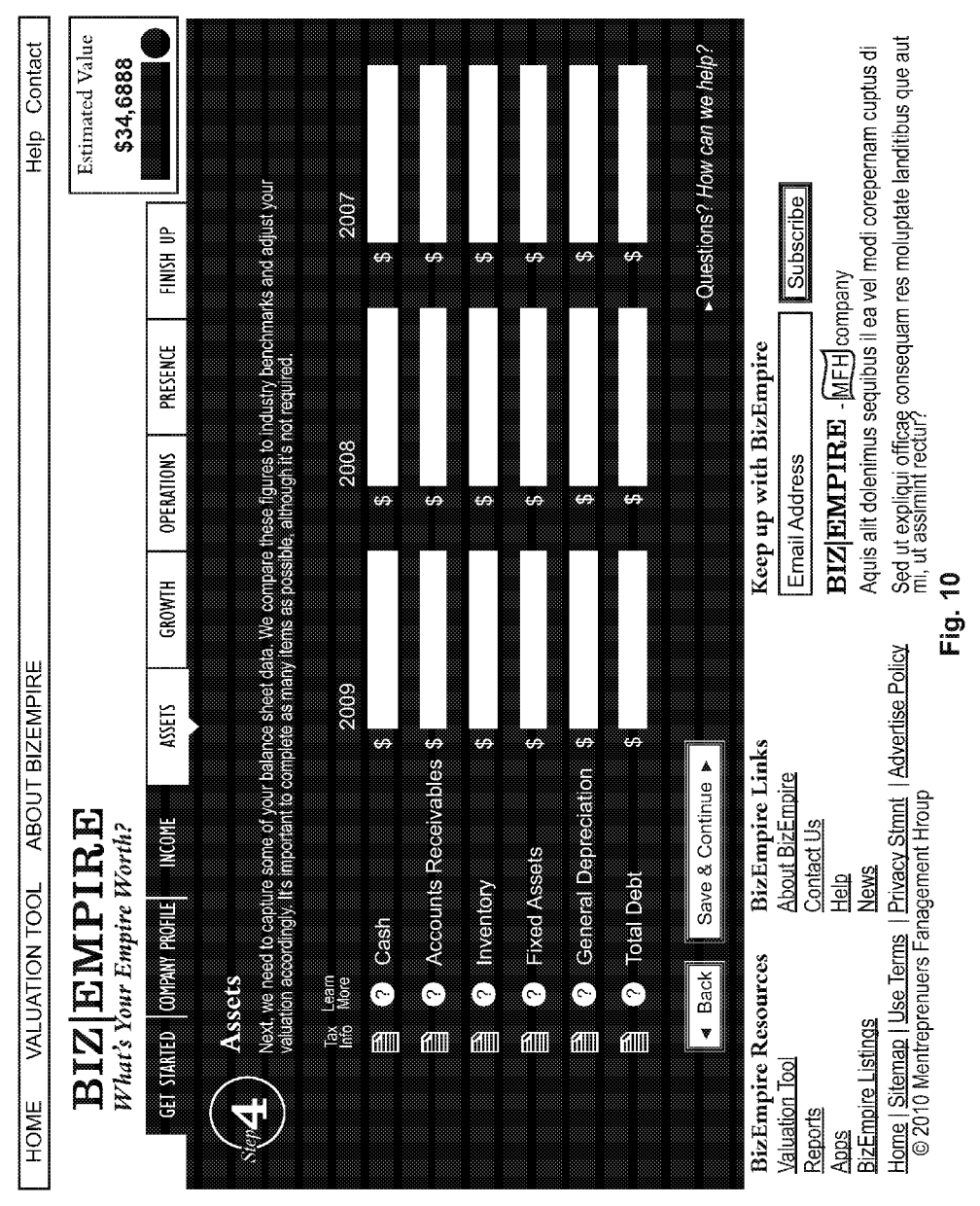
Figure 11:
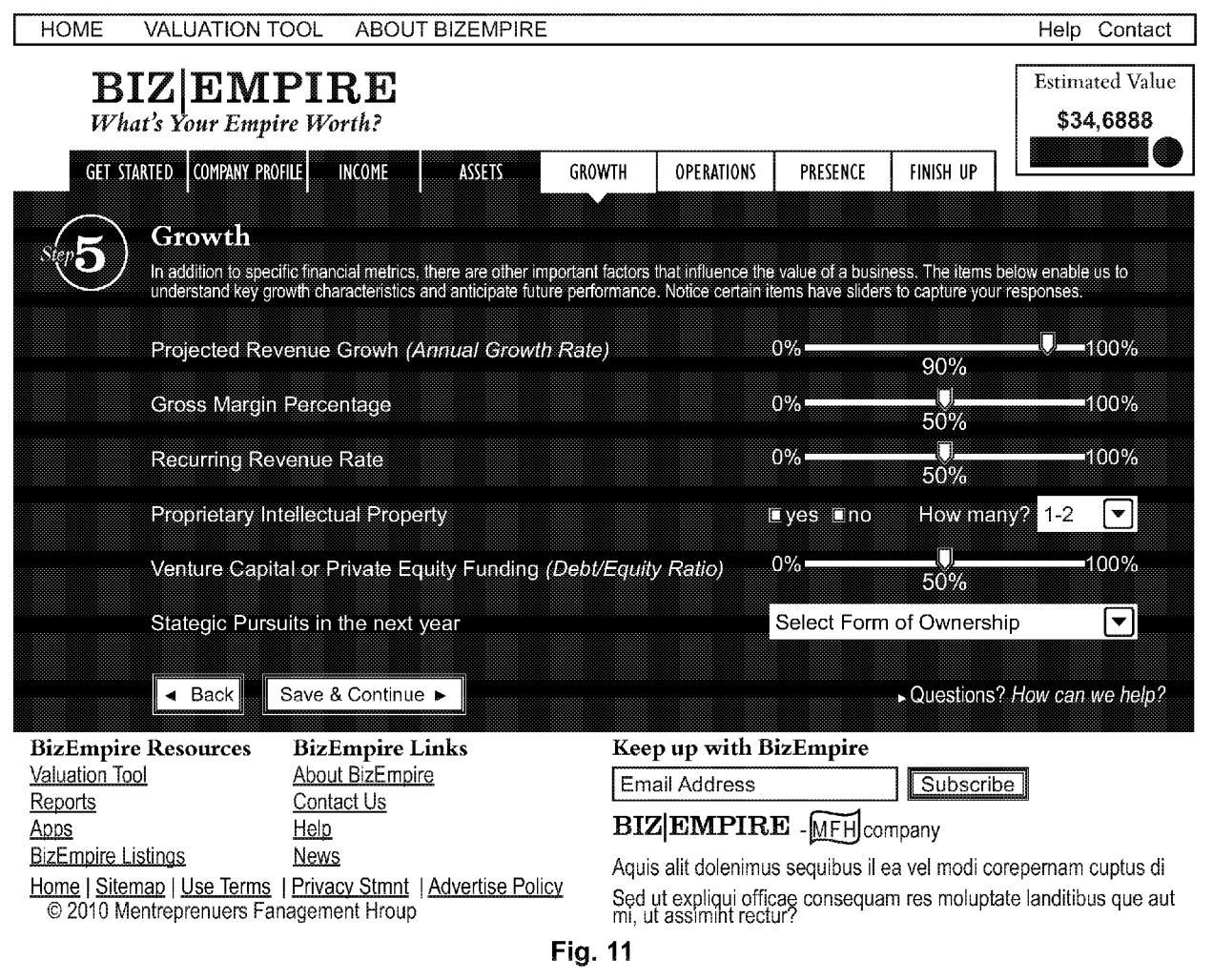

FIGS. 9, 10 and 11 show the accumulation of financial information for use in a valuation. For clarity, FIGS. 9, 10 and 11 illustrate the queries within these steps as provided in separate graphical interface (UI) screens, although those skilled in the art will appreciate that these queries may be provided in one or more combined steps seeking financial information, for example. As illustrated, the requested financial information may include revenue, pretax income, interest expense and owner salary/benefits, as well as assets in the form of cash, accounts receivable, inventory, fixed assets, general depreciation and total debt, and additionally the projected revenue growth, gross margin percentage, recurring revenue rate, intellectual property, debt-to-equity ratio and/or upcoming strategic pursuits. Needless to say, as discussed herein, helpful information may be provided with regard to the requested information at each stage, such as a detailed definition of the requested information.

Figure 12:
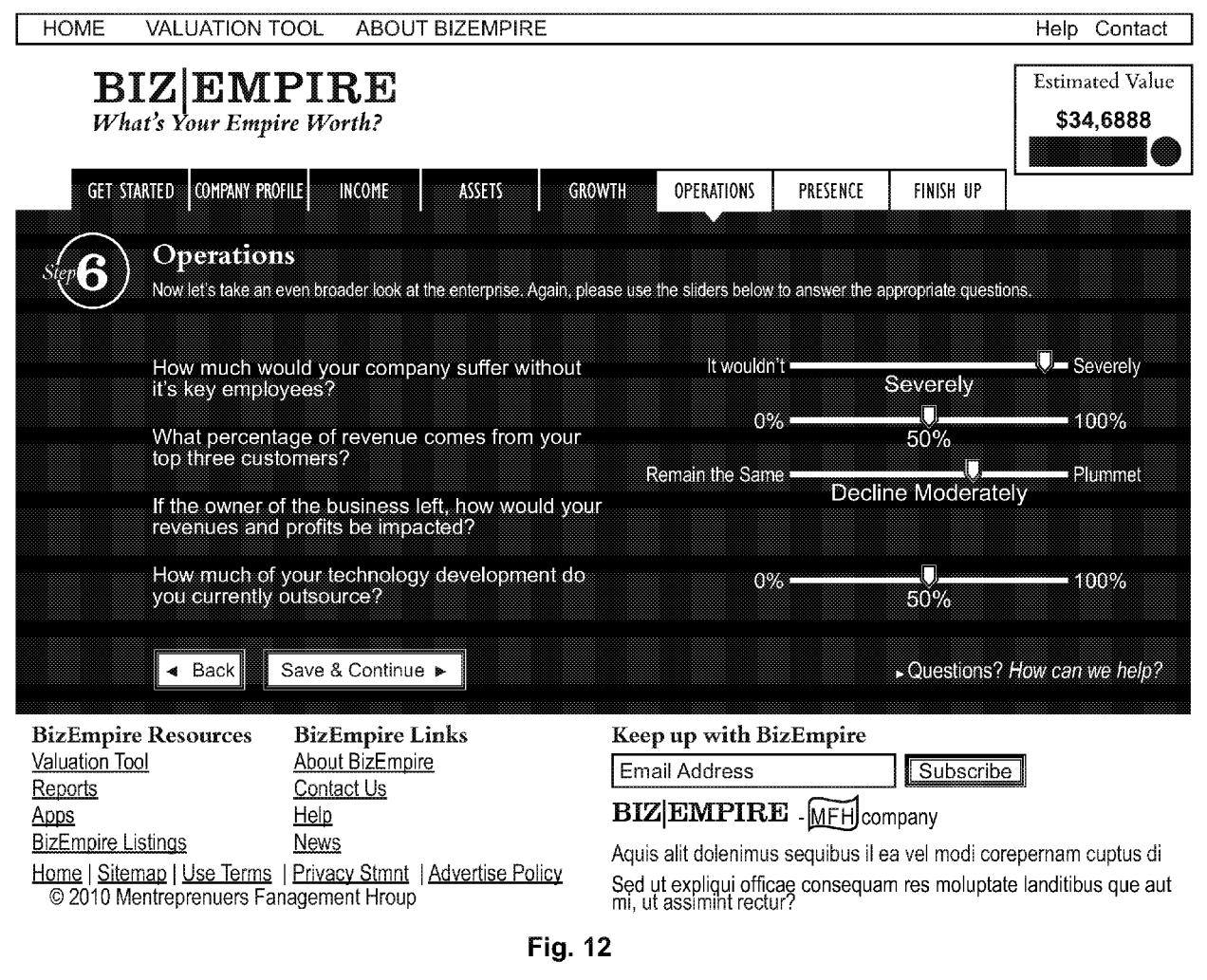
Figure 13:
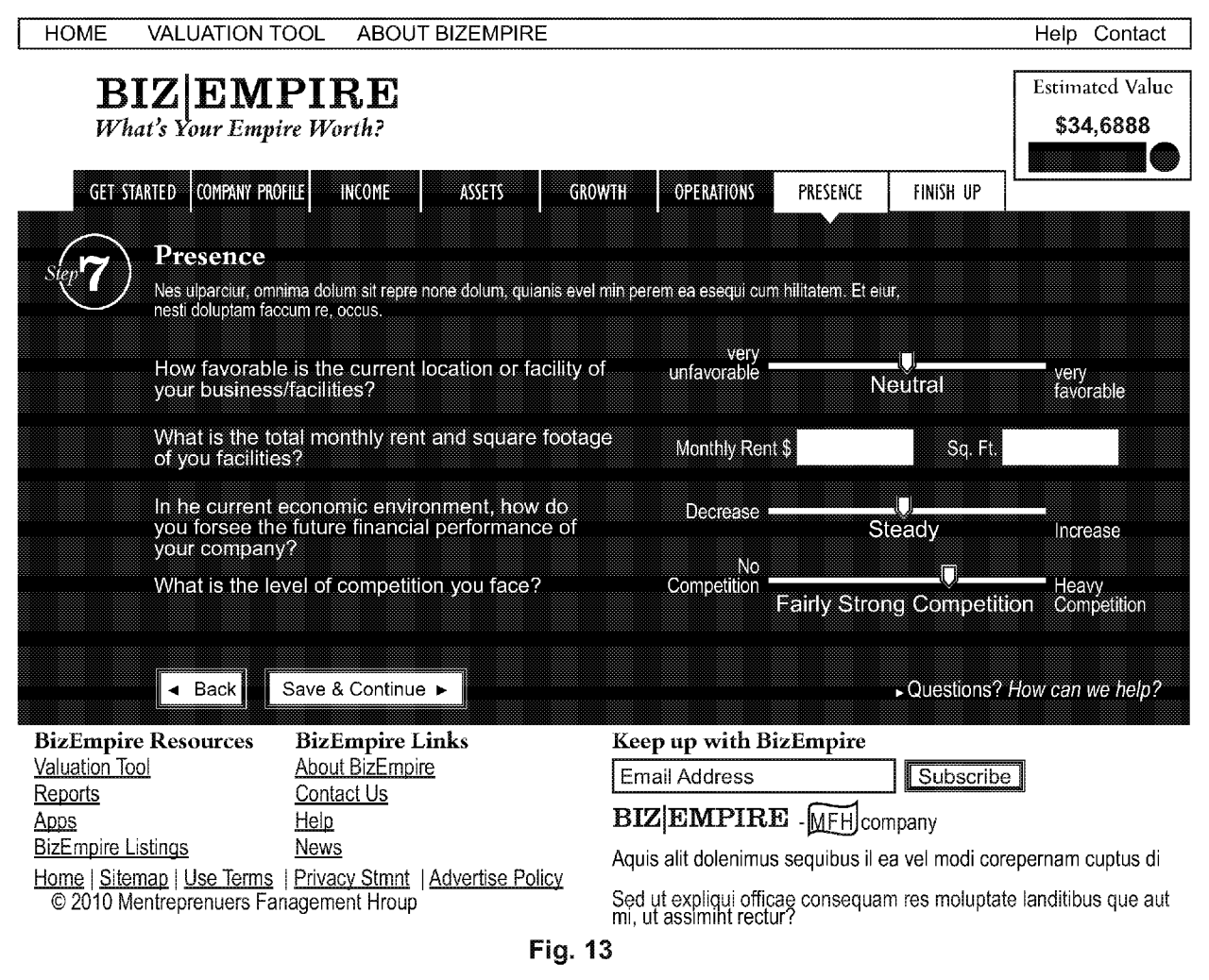

FIGS. 12 and 13 illustrate the assessment of operations and plant information. For clarity, FIGS. 12 and 13 illustrate the queries within the steps as provided in separate graphical interface screens, although those skilled in the art will appreciate that these queries may be provided in one or more steps, for example. As illustrated, requested operations and plant information may include, by way of non-limiting example, effects of loss of key employees, percentage of revenue from certain customers, impact of the loss of the owner, portion of research and development that is performed in-house/outsourced, favorability of current physical plant, size and cost of physical plant, estimated future financial performance, and/or the level of competition in the field of endeavor. Such information, and other like information provided in FIGS. 7-13, may be subjectively provided, wherein subjective keywords are used by engine 202 for algorithmic conversion to objective categorical ratings, or the information may be objectively provided, the subjectivity of the query notwithstanding, such as through the use of a virtual and interactive sliding scale for user data-entry.

Thus, as discussed herein, the query steps may include queries related to general company/profile information, financial information (such as income, assets and growth factors), and operations/personnel information. These query steps may be broken down further into additional query steps, such as in order to gain additional information for a valuation and/or scoring. Such additional information may vary in accordance with an industry of the requesting user, a type of valuation or scoring requested, or the like. Other factors may be optionally added to query steps, or may be weighted if entered at the option of the requesting user. Such other factors may include, for example, third party information and/or publicly available information (such as public relations information).

In addition to information maintained/monitored by engine 302 and its associated database(s) for reporting and/or accounting purposes, the present invention may also intake information related to a company's infrastructure and/or ownership interests. Such infrastructure components may include, for example, real estate holdings, physical plant aspects including machinery, equipment, vehicles, tools and tooling, and computers, and virtual plant operations including database capacity and cloud services, employees, service contracts and the like. Other aspects that may contribute to valuation may include such items as options on cloud-based computing capacity, the length of various service contracts, such as a contract to perform or a contract providing access to certain audiences, for example, purchase orders, ownership interest in a subsidiary or other entity, certification and/or licensed access to certain markets, and/or third party ownership interests in the company, for example.

By way of non-limiting example, the company may hold a five (5) year contract for services which may allow for the computation of highly likely level of revenue over the life of the contract. Similarly, the company may hold a right-of-first-refusal to cloud-based data processing capacity and may be able to leverage such capacity in its own business or lease or rent such capacity to a third party. In any event, the capacity may be valued and used with the valuation calculated by the present invention.

Further still, third parties involved with the company may effect a valuation. For example, a third party company may be a minority shareholder and may have a vested interest in the success of the company. For example, if a third party investor company has a business which may use or benefit from the offerings of the invested company, news of or actual demand may add positive value through, for instance, estimating the boost to the business expected by the investor company. Similarly, negative earnings or news, for example, from the investor company way weigh negatively. A "business disinterested" investor may boost the company value simply based on the size or influence of the investor, such as, for example, if Warren Buffet is the investor.

Further, by way of non-limiting example, a significant positive announcement regarding a joint venture entered into by the business of the requesting user may be deemed by engine 302 to have an appreciable positive effect on the valuation or score of the business of the requesting user. Such other factors affecting valuation may be simple or complex—for example, the number and results location for the business on Google searches, above or below average marketing realizations for the company's website, and other similar factors may be used to indicate company value. Thus, this other information may be obtained from the requesting user via the UI at presentation layer 306, or may be obtained as otherwise discussed with respect to system 300.

As discussed herein, the information provide to the present invention may allow for the tracking of the value of individual assets. Thus, the valuation of the business produced by the present invention necessarily includes the value of the reported assets and may allow of the value of assets within a business to be valued as a function of the company valuation as a whole. This may be true regardless of whether a value for the asset is obtained from the company or a third party source.

For example, certain assets not valued by the company but entered into the present system as being held by the company may have a value derived from third party sources and/or derived from the valuation given such an asset within the present invention. The latter may be possible given the accumulation of assets and their values within the present invention through the valuation of other companies. Even though, for example, no asset is identical, the present invention may asymptotically approach the value of a discrete asset by approximating the value of like asset value information contained within the system. If the number of comparable assets is too low, the present invention, as discussed above, may query a third party source(s) to collect a sufficient sample size. As one skilled in the art would appreciate, the greater number of assets tracked by the present invention may allow for a more accurate valuation of assets lacking a specific valuation and may eliminate the reliance on third party information sources allowing the system to value assets in the created marketplace.

Using this same methodology, the present invention may also allow a user to query the present invention to provide a valuation on an asset by asset basis. For example, if the company does not have a value for a particular asset, such as a particular year, make and model frontend loader, for example, the present invention may aggregate assets similar in type, year, make, model and/or condition and approximate a present day cash value, for example. Similarly, the present invention will automatically perform such a valuation if an asset is entered as owner by the company but is not specifically valued. In his way, a valuation may still be generated by the present invention and may be relied upon by third parties given approximation results, including the number of references used in the approximation, provided by the present invention. Although this feature may not be necessary for smaller assets, such as the frontend loader in the example given, such a certification by the present invention may be needed if the asset is of great individual, alone or in relation to the company's valuation.

Figure 14:
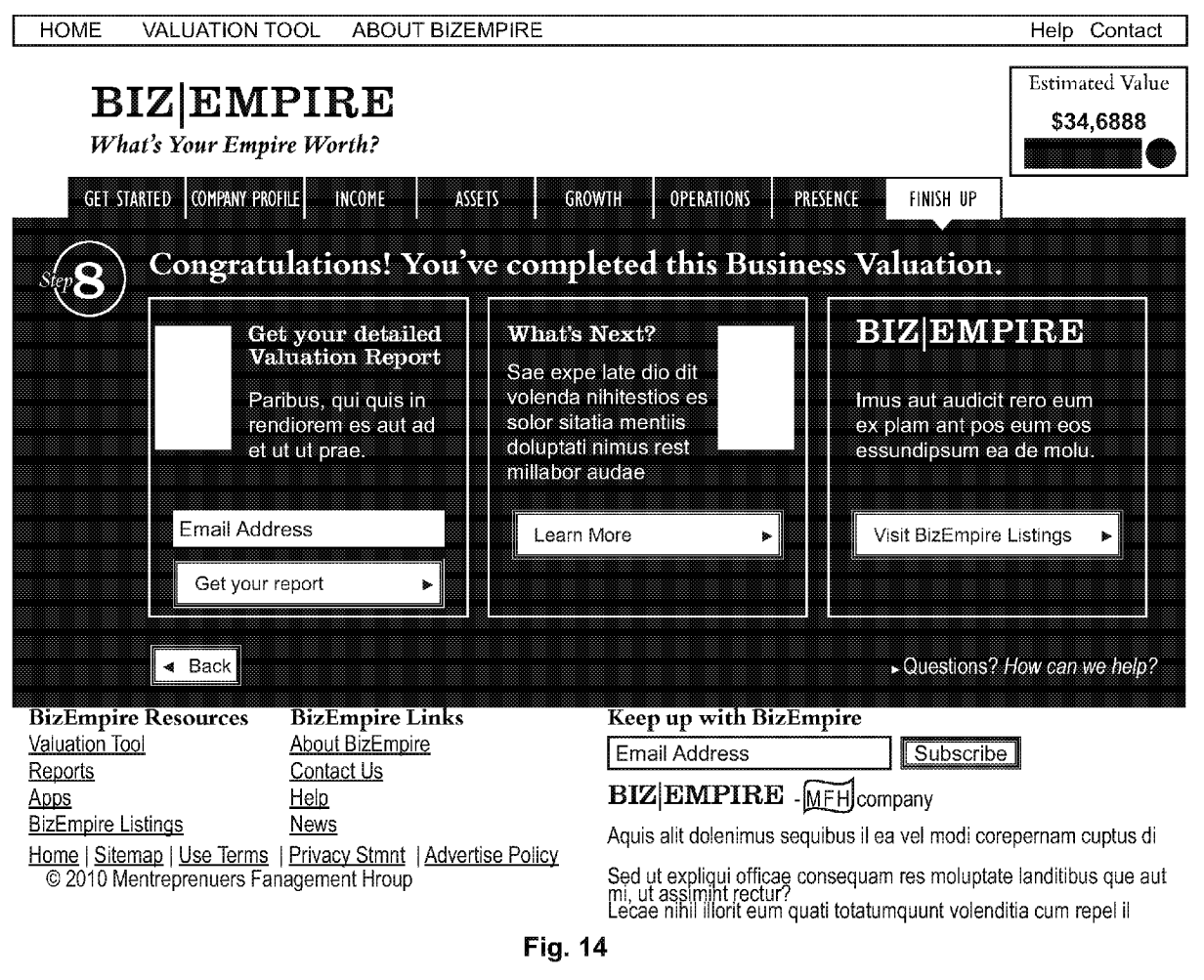

Upon completion of the aforementioned steps, a valuation report may preferably be generated by engine 302. The report may be generated securely, such as using encryption via the thin client provided by the presentation layer, or via secure email, as illustrated in FIG. 14. The report so-generated may include, by way of non-limiting example, a valuation in any format, such as pursuant to receipt of payment for the valuation, and/or may include upsell and like offers. For example, the base valuation may include a single valuation value reached by engine 302, and/or may include a multi-tiered valuation reached by engine 302, such as a worst-case valuation, a highest probability valuation, and/or a best-case valuation. The report may further include, or may include only pursuant to purchase of an upsell, an enumeration of factors, and details related thereto, relied upon by engine 302 in reaching the valuation. Such factors may include an indication, such as a numerical rating, of the importance of particular factors in reaching the valuation. Needless to say, the importance of particular factors may vary in accordance with the subject tier of a multi-tiered rating.

Figure 15:
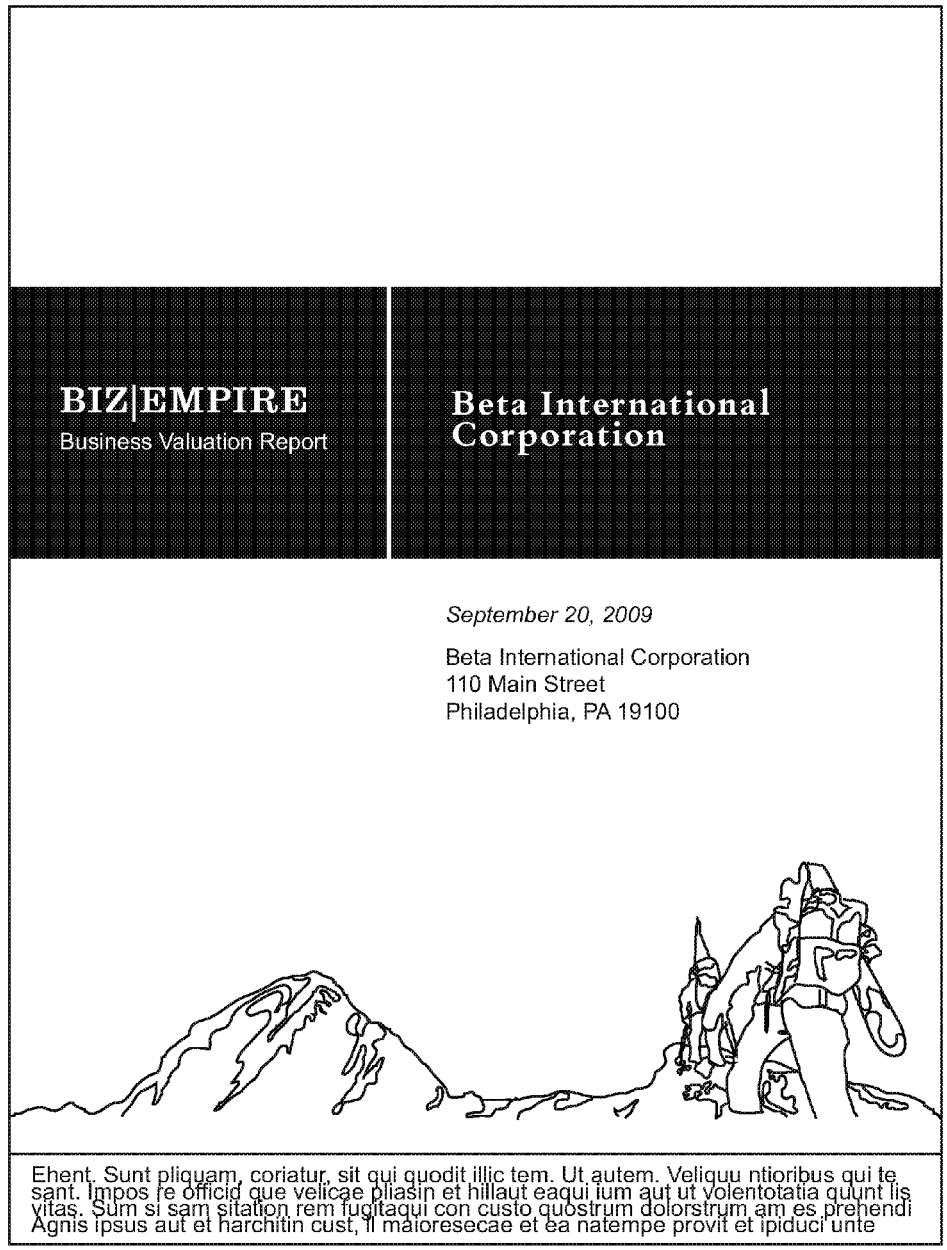
FIG. 15 illustrates an aspect of an exemplary embodiment of the present invention.
Figure 24:
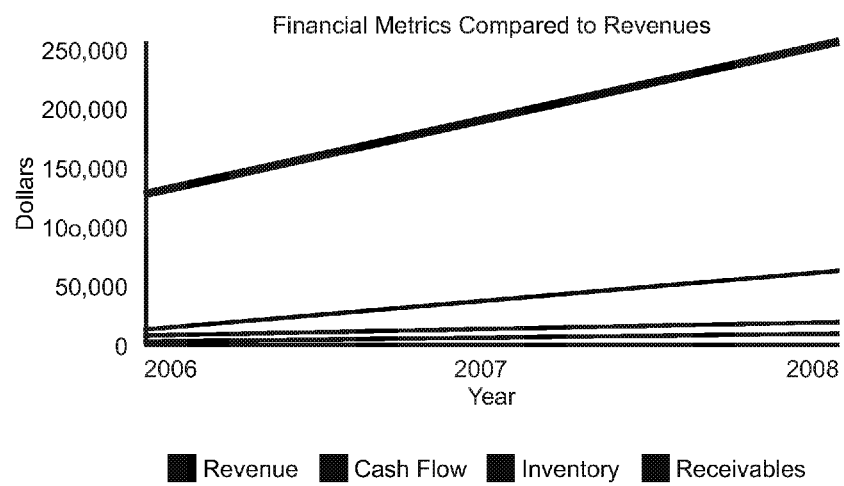
FIG. 24 illustrates an aspect of an exemplary embodiment of the present invention.
Figure 25:
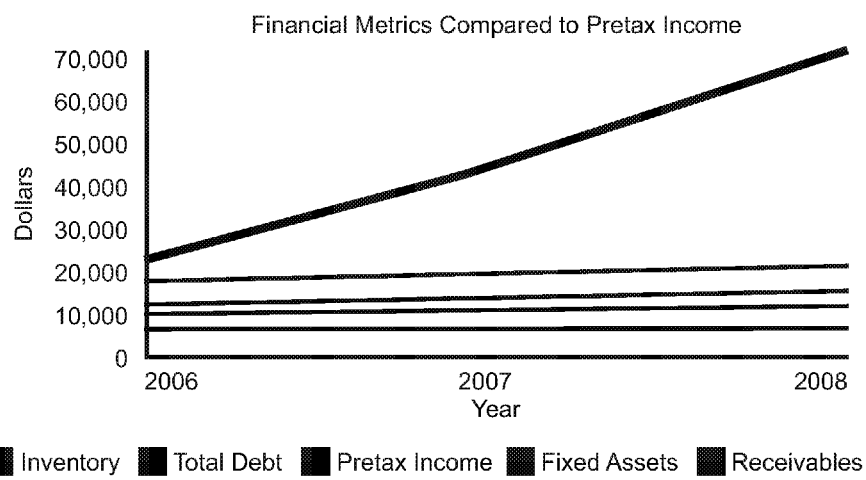
FIG. 25 illustrates an aspect of an exemplary embodiment of the present invention.
Figure 26:
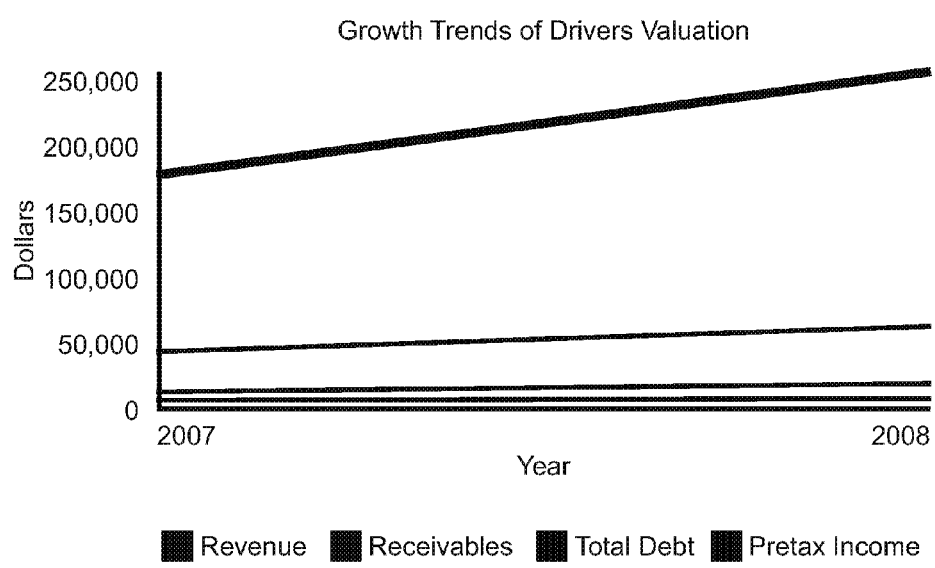
FIG. 26 illustrates an aspect of an exemplary embodiment of the present invention.

An exemplary abbreviated valuation is illustrated in FIGS. 15-17. A more detailed valuation report is illustrated in FIGS. 18-31. As shown, reports, valuation and scoring may be customizable, and further may be stored, such as in association with a user login. Moreover, as illustrated, an aspect of the report may include recommendations for repeat business, and further may include cross-selling opportunities. By way of non-limiting example, and as shown, a valuation may include a recommendation as to when an updated valuation should be obtained, such as pursuant to a certain periodicity, or pursuant to changes in certain factors deemed key to the valuation. Further, valuations, such as in a private labeling embodiment, may be maintained internally to the requester and updated periodically, such as quarterly, for shareholder reports, for example. Likewise, a valuation may include cross-selling indications as to ways to improve valuation, such as recommending intellectual property attorneys to increase the size of the requester's intellectual property portfolio, prospective investors or accountants, and the like.

Related to the valuation, and/or as upsells for the valuation, there may be offered, for example, other functions also illustrated in the exemplary embodiment of FIG. 14. For example, for an upsell fee, or for no additional fee, the valuation requester may participate in a flagging program, such as to indicate external to the secure system of the present invention that the requesting business is for sale, or is seeking investors, for example. Flagging is discussed further hereinbelow. Similarly, as shown in the exemplary illustration of FIG. 14, there may be offered a participation in listing services, for an additional fee or no fee. Such listing services may make locatable, such as via search, one or more of the company and valuation, some or all of the query step responses and/or factors related to the valuation, information related to the business, its industry, its location, its employees, or the like, and/or the businesses score or rating akin to a FICO score, as also discussed herein.

Further, under the laws of many jurisdictions, both foreign and domestic, private companies must or may periodically obtain a valuation of the company's worth. In the United States, such a valuation may be required under Rule 409A, for example, for nonqualified deferred compensation. Such compensation may include stock options and stock appreciation rights, for example. More particularly, Rule 409A dictates that every privately held company that issues nonqualified deferred compensation must get a formal valuation (i.e., one calculated by a third party), to allow for the issuance of options at a fair market value.

Although certain instruments are not subject to Rule 409A, such as restricted stock, a Rule 409A valuation may nevertheless allow the company to provide third parties with a verified valuation and may further constitute certain information that may be necessary and/or desirable for tax and other reporting purposes outside typical 409A type compliance. For example, the information generated and verified by the present invention may also be used in conjunction with a FAS 123R and/or 157 valuation (herein also referred to, in conjunction with a 409A valuation, as a "409A valuation" or a "verified valuation"). Similarly, instruments first exempted, such as incentive stock options, may become subject to Rule 409A if, for example, it is determined that the fair market value of the option price is greater than the strike price at the date of grant.

A Rule 409A valuation may be completed by an independent, qualified, experienced third party using a reasonable application of a reasonable valuation method. The Rule 409A valuation, once first completed, generally must be updated, such as every 12 months, for example. Updates may be more frequent if, for example, the company experiences a significant occurrence, such as, for example, a new product release, a new financing round, an expansion or acquisition, or significant funding or other capital infusion. Compliance with the updating aspects of Rule 409A is important, as penalties wrought by certain jurisdictions may include taxation of any under-valued evaluation either to the company and/or to its employees personally. Such penalties may also include a twenty (20%) percent surcharge and/or additional interest charges.

The valuation of the company, for the purposes of compliance with Rule 409A and like regulations, may include any number of valuation points and may be dependent on the type of recent activity that triggered the need for an evaluation and/or update. For example, in an arms-length financing round, a valuation of the common stock value may be based on the value of the round using various techniques, including, for example, an option pricing model, such as Black-Scholes, lattice, or Monte Carlo, depending on the complexity of the company's capital structure. Other techniques may include, for example, a current value method and may be dependent on the complexity of stock issuance and the type of events that have occurred with respect to the company. Importantly, the valuation may consider facts specific to the company and/or to the company's profile and/or data, such as, for example, data on restricted stock studies in support of calculating a marketability discount, for example.

In addition to the particular company-based derived values previously discussed herein, a valuation calculated by engine 302 of the present invention may also use one or more values related to the following sources: a) the value of tangible and intangible assets of the corporation; b) the present value of future cash-flows; c) the market value of stock or equity interests in similar corporations and other companies engaged in trades or businesses substantially similar to those engaged in by the corporation being valued, the value of which may be determined by objective means (such as through trading prices on an established market or an amount paid in an arms length private transaction); and d) other relevant measures, such as control premiums or discounts for lack of marketability (as mentioned above) and whether the valuation method is used for other purposes that have a material economic effect on the service recipient, its stockholders or its creditors, for example.

Utilizing the steps enumerated herein, a verified valuation may further rely upon additional steps and or actions to provide additional value points and verification of at least one aspect of Rule 409A. By way of non-limiting example, and additional 1, 2, 3 or more steps may be added to the aforementioned inputs requested from the user of engine 302. As such, for example, the user may be asked to engage in a 10 step, rather than a 7 step, process should the user wish to obtain a Rule 409A valuation. Moreover, certain of the information, or additional information requested of the user of engine 302 may need to be verified or certified information in order tllow for a Rule 409A valuation. Yet further, those skilled in the art will appreciate that a Rule 409A valuation may have an additional charge, or a unique charge, to the user related thereto, and such additional charge or unique charge to the user may or may not vary in accordance with whether the user is generating a new Rule 409A valuation, or updating a previous one or ones of a Rule 409A valuation.

The calculation of a 409 type valuation may include, in addition to other calculations made by the present invention and/or inputted by the user, stockholder equity and capitalization information, information regarding materially adverse or favorable changes to the business (including, but not limited to, actual and potential legal actions), and pipeline, forecast and time to close numbers and ratios. As such, the aforementioned additional steps in the valuation in order to receive a verified valuation may be (1) stockholder equity and capitalization, (2) material changes to the business (including, but not limited to, actual and potential legal actions), and (3) pipeline, forecast and time to close.

In addition to the functionality described herein, the use of the present invention to provide a 409A type valuation may require the user and/or person inputting information on behalf of the company to sign on securely and to authenticate credentials, such as in addition to any log-in relating to a non-Rule 409A valuation as discussed herein. Once authenticated, company information needed to provide a satisfactory valuation may be imported through documents, such as spreadsheets and text documents, and the like. Such documents may be stored by the present invention to allow for review and/or comparison of past data, and/or for present day compliance requiring historical information.

The present invention also provides a user interface which may allow for collaboration components to work with accounting and legal firms that work with the company, as discussed elsewhere herein. For example, the company may authorize a specific accounting firm to interact with the system to provide detailed financial information, such as in the event certified data is required upon a request for a 409A valuation. In addition, authorized third parties on whom the company relies to provide certain financial and legal services may have independent authentications required, and once authenticated may provide verified information necessary for a 409A valuation. In other words, the submission by third parties having a professional bar or other recognized form of credential may be recognized within the system as being directly from such a source, such as via an authentication.

Monetization of this aspect of the present invention may include providing access to company personel and company authorized individuals for the purposes of providing and/or maintaining/accessing company information resident in the system. The present invention may allow users, and more specifically high level company users and agents to manage and discuss the information provided to the system and the analysis therein.

Figure 34:
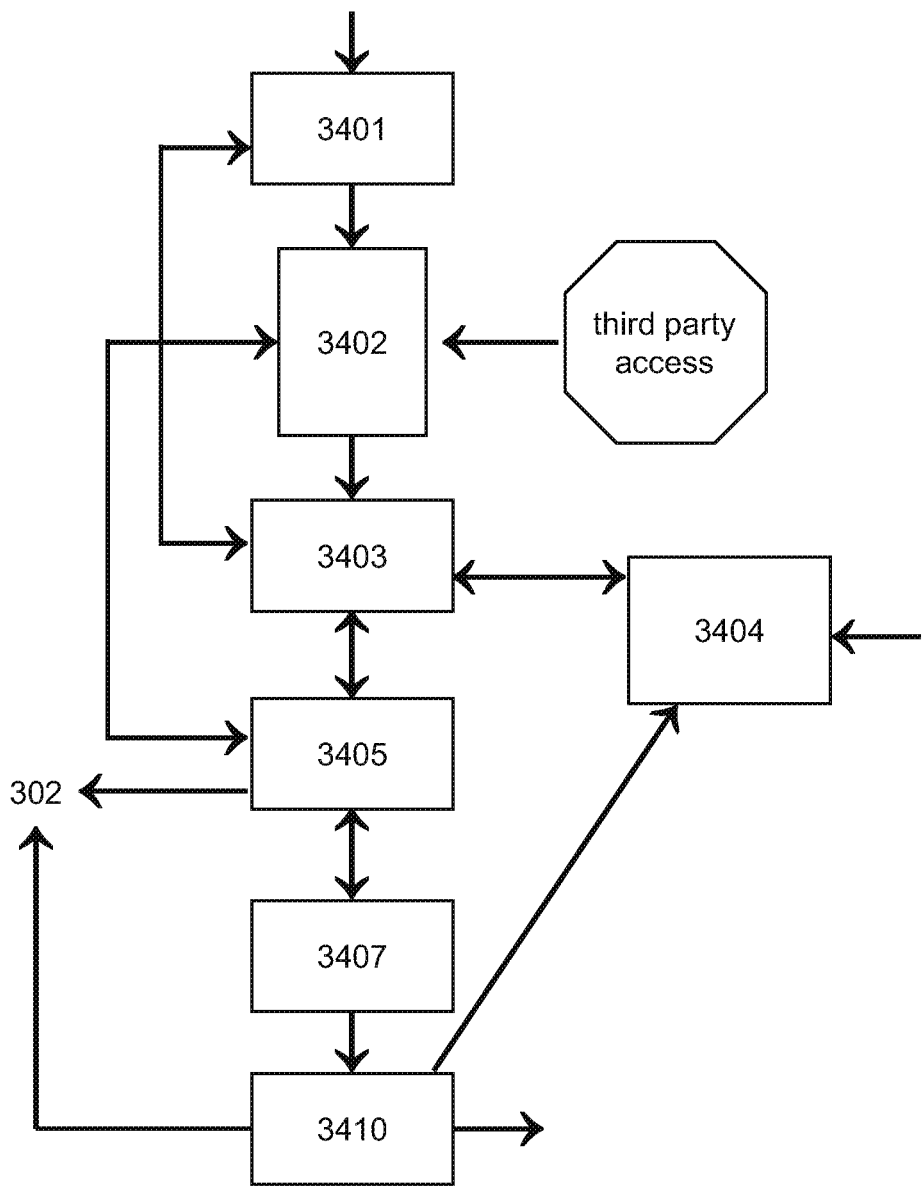
FIG. 34 illustrates an aspect of an exemplary embodiment of the present invention.

As illustrated in FIG. 34, the present invention may provide the user of the system access to the business valuation aspect of the present invention at step 3401. Once the process has begun, the company may input, or choose from a list of users within the company or at third parties, those individuals that may have access to the evaluation process at step 3402. Regardless of whether or not any additional users are granted access, the system may begin with the acceptance of the information described herein at step 3403. Once information has been entered, the present invention, in part through engine 302, may alert the user whether sufficient information has been entered to provide a 409A or like valuation acceptable for use with a government entity in step 3404. The system may provide, even if insufficient information was entered, a non-409A valuation of the company in step 3405. The system may further ask, at step 3407 and to the extent the entered information was insufficient, whether the user wishes to enter the lacking information. If the user chooses to enter the information requested at step 3407, or if the information entered at step 3403 was sufficient, a 409A valuation may be outputted at step 3410.

As can be appreciated by those skilled in the art, the present invention may be a cloud based system accessible through a variety of portals, including, but not limited to, secure network connection with each participating company. Access to the system may be in the form of a subscription and may be based on a temporal basis. For example, the present invention may allow for 409A (or the like) annual subscriptions costing between about $1,500.00 and $5,500.00, such as based upon the size of the business. The size of the business may be determined by the estimated value or stated number of employees at renewal or beginning of each 409A subscription. The price of subscription may be adjusted within the annual period to account for changes in the company or differences between the stated value and the value calculated by the present invention, for example. Of course, usage by a company may be unlimited within the subscription period and additional users beyond an initially provided sum may be each charged a specific additional fee, for example.

Business Scoring System

In the past, integrated valuation models have developed in a variety of sectors, such as in real estate. For example, the proliferation of sites such as zillow.com, MLS listings, eppraisal.com and the like allow homeowners to get a quality, highly valid assessment of the value of real estate. Similarly, the availability of credit scores for individuals, and creditworthiness ratings for businesses, have allowed for comparison between otherwise disparate individuals and businesses for reasons such as the issuance of credit, investment, purchases, and the like. However, prior to the advent of the cloud-based, FICO score equivalent for business provided in the present invention, such a value chain did not exist in a widely available and affordable form for consumption by large and small businesses.

The business valuation engine 302 discussed hereinthroughout, in conjunction with system 300, readily lends capabilities to allow for the present invention to provide a FICO score-equivalent for business. For example, the business score may be provided in conjunction with a valuation, or may be provided as a stand-alone, such as pursuant to payment of a separate fee. Further, the business score may be listed, or may be an aspect of a listing regarding the subject business that also includes other information, in accordance with the herein described services.

Figure 32:
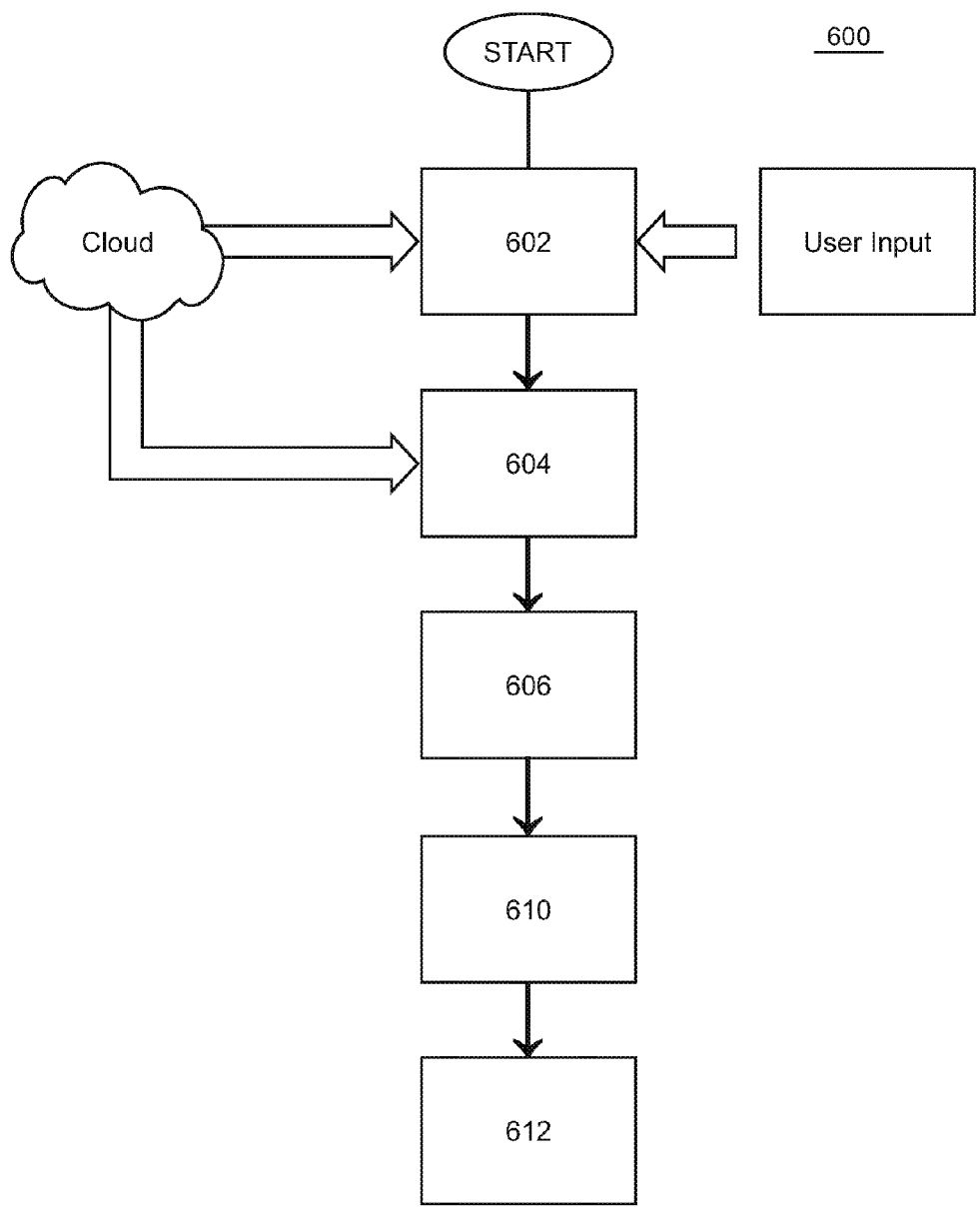
FIG. 32 illustrates an aspect of an exemplary embodiment of the present invention.

For example, and as illustrated in the flow chart of FIG. 32, engine 302 may perform a foreground (if the valuation is the requested service) or background (if the valuation is not the requested service) valuation at step 602, as detailed herein. The engine may further, as discussed herein, have available to it, such as externally via the network cloud, valuations of other, larger companies, such as publicly traded companies and the like. The valuations of other, larger companies in the same industry as the business of the requesting user may then serve as a baseline, at step 604, for the score of the requested business.

A scale may be assigned for a rating across all businesses and sectors/industries, such as a scale of 1-800, and the healthiest businesses (i.e., the businesses worth the most) in the same sector as the requesting business may be assigned a score of 800 for that vertical at step 606. It may be further assumed that, for example, a business scoring 200 would have a financial status (i.e., the valuation performed by engine 202) that would indicate imminent failure of the business. Thereafter, a sliding scale may be applied at step 610 to the requesting business, i.e., if certain important factors, such as debt/equity ratio, generation of intellectual property, or the like, would indicate that a requesting business is 60% financially advanced over others in the space toward the financial health of the business(es) scoring 800 in the subject vertical, the business may receive a score of 200+0.6×800=680. The score may be output at step 612, such as via any of the methods discussed herein for outputting a valuation report, i.e., such as via thin client, thick client, paper output (mail), email, widget, app, or the like, by way of non-limiting example.

Business Flagging System

Figure 33:
FIG. 33 illustrates an aspect of an exemplary embodiment of the present invention.

FIG. 33 illustrates a flagging option to be used in accordance with the present invention. As shown by the exemplary flags, a number of flags may be selectable by the requesting/participating user to indicate a status, want, need, or the like of the requesting user's business. For example, a small business may be looking to raise funds, explore mergers, meet partners, or sell a company. Conversely, a large business, investor or bank may be looking for partners for, for example, SBIR participation, or may be looking to make investments or to make acquisitions in certain technologies, or the like.

By providing the flagging system discussed herein, these indications may be made when a party is located by a search, such as a search for parties having the desired status, in accordance with the discussion herein and on the thin client, thick client, app, widget, or the like UI from which a valuation would be generated according to the present invention. Additionally or alternatively, a requesting user may place such a flag in association with the user's website, such as by insertion of java thereon, or by association of a widget therewith, by way of non-limiting example, to indicate to visitors to the site, or to search engines that pick up the site, information with regard to the requesting business's status.

It almost goes without saying that the flags illustrated in FIG. X31 are exemplary only. That is to say, other types of flags, indicators, colors, markers, audio or visual cues, metadata, or the like may be used as a "flag" to facilitate the marketplace regarding or between flagged businesses in accordance with the present invention.

Revenue Generation Systems

The systems and methods of the present invention provides several opportunities for revenue generation to the provider of the methodology. The first is generation of revenue from highly targeted advertising. As discussed hereinthroughout, the present invention receives and tracks information regarding a business at the steps during which input is requested. Additionally, information incorporated from outside the engine of the present invention, such as a creditworthiness score or a Dunn & Bradstreet report, by way of non-limiting example, as well as information generated for inclusion in a valuation report in accordance with the present invention, may be accumulated by the present invention. All such information accumulated, namely the entered information, the information externally gained by the engine of the present invention, and the reported valuation information, may further be associated with an account associated with the report requester, which account may additionally include yet further information. Some or all of such accumulated information may be tracked to allow for highly target advertising to users of the present invention.

A second revenue generation model includes individual or subscription sales of the valuation reports and/or scores associated with the engine of the present invention. Subscriptions may be, for example, annual or monthly, for example. For example, the reporting and/or scoring and/or flagging associated with the valuation generation, as discussed herein, may allow for entry of payment information, such as locally to the requesting user, for receipt of payment remotely via the service provider, such as using a network connection between the requesting user and the service provider. Such a case-by-case payment schema may require the same payment from any requesting user, or may, for example, allow for the required payment to vary based on particular factors, such as the number of employees or debt-to-equity ratio of the requesting user. Payment schema may vary dynamically, and payment may be entered via any known method, including via entry of credit card or Paypal information.

In an embodiment of the present invention, payment by the user may be made on a subscription basis and may provide to the user a certain subset of services and/or alerts related to the present invention. For example, a user may pay a flat monthly rate for access to all system features and may be provided with updates and other automated alerts when changes and/or events occur, such as, for example, the market value of a company asset changes by a predetermined amount. Such a monthly fee may be based on the size of a company and/or the number of company users provided authorized access to the present invention. A monthly fee could also be a flat rate regardless of company characteristics and may be, for example, $49.95 a month. This "all you can eat" model may allow a company to control costs while gaining having access to the valuation tools and information provided herein.

Such a payment scheme may also facilitate more frequent usage of the present invention by an individual company which may make the data within the system more accurate and robust. Without paying on a per diem basis, for example, a company and/or their authorize representative/agent may more fully utilize and update the information within present invention. The system may also prompt users to interact more with the system by sending out information and/or valuation updates. For example, through the notification engine _____ illustrated in FIG. _____, the company may be notified if/when a third party requests information about the company and what information was given. Similarly, the system may further alert the company to update certain aspect of information which may impact the information being seen by third parties. This may occur if, for example, the company has not updated certain financial information for a certain period of time.

An additional revenue generation model according to the present invention includes a private labeling and/or licensing system for accessing the reporting/scoring/flagging engine 302. Such private labeling may allow for certain of the herein-discussed entities to whom the present invention would be highly useful, such as an insurance agent endeavoring to sell a client an adequate level of insurance commensurate with a value of a business owned by such client, to privately sell access to the reporting/scoring/flagging engine. Private labeling revenue may be generated by, for example, first receiving, by the engine 302 provider, of an activation fee. Further fees might include, by way of non-limiting example, fees for each transaction consummated by the private labeler, and fees for providing technical support, hosting, bandwidth, and the like.

Exemplary Offerings

The following sections illustrate, by way of non-limiting example, exemplary embodiments in which the present invention may be offered in, for example, a private labeling or license context. However, these exemplary embodiments are not limited to private labeling or licensing contexts, and may thus be made available on a payment per transaction basis, a payment per bulk transactions basis, or like bases, as will be appreciated by those skilled in the art in light of the discussion hereinbelow.

Accounting Firm

Use of the present invention to allow accounting firms to provide reporting and/or scoring for small businesses and small business-owner clients may provide increased frequency of client interaction, including on matters other than taxation. For example, a simple, yet highly valid valuation provided through the use of the present invention may attract more offline and/or detailed business valuations. Further, prospective valuation reports, i.e. reports regarding the effects of various business opportunities, such as taking on additional investors, may allow for the providing of a growth consulting practice that allows for businesses or business owners to predictively analyze how best to grow the worth of a business, either for business or personal reasons. Such a licensing or private labeling model may be based upon an up front payment, royalty per transaction, and/or a license based on number of employees of the business to be assessed and/or the accounting firm, by way of non-limiting example.

Retail Bank

Use of the present invention to allow retail banks to provide and/or analyze reporting, flagging and/or scoring for small businesses and small business owner clients may provide the ability to more effectively and efficiently attract better and more loans for small and emerging growth businesses and business owners. Further, current reports and prospective valuation reports may allow for improved and more critical risk management, broader accumulation of risk management data (such as by having more and better analysis across branches), and improved prediction of potential loan success. Such a licensing or private labeling model may be based upon an up-front payment, royalty per transaction, and/or a license based on number of branches or assets under management, by way of non-limiting example.

Insurance Firm

Use of the present invention to enable insurance firms to provide reporting and/or scoring for small businesses and small business owner clients may provide a conversation starter for policy issuance or coverage updating, as well as an improved conversion tool for financial advisors that offer insurance products, for example. Similarly, the use of the present invention by insurance firms may have applicability for buy-sell agreements with business partners, and/or for estate planning, for example. The present invention may be offered, in an embodiment such as this, in a secure manner, such as via intranet or behind a firewall, solely for use by licensed agents and/or account managers.

Yet more particularly, the present invention may provide an upsell tool for premiums. In typical embodiments, insurance agents offer, for example, term life and whole life policies, but the adequacy of the coverage of such policies, for a small business owner, is highly related to the value of that small business owner's business. Thus, the present invention allows the small business owner to be provided with a highly valid indication of business valuation, and, if the received business valuation indicates that the insurance coverage for the owner of that business is not adequate, an adequate policy may preferably be up-sold to the small business owner.

A licensing or private labeling model as discussed in this section may be provided, for example, as a bundled financial advisory and assessment tool, or as a stand-alone. The licensing or private labeling model may be based upon an up front payment, a royalty per transaction, and/or a license based on number of reports run by agents, by way of non-limiting example.

Sale/License Broker

The present invention may enable brokerage/auction sites and firms to provide reporting, flagging and/or scoring for small businesses participating in the site, or with the firm, such as to find a buyer, investor, or licensee for the small business or its technology. By way of non-limiting example, the valuation, flag and/or score of a small business may be included in its searchable profile on a broker's site, whereby a prospective buyer, investor or licensee may readily view the valuation, flag or score of the small business. Thereby, the prospective buyer/investor/licensee may receive an indication whether a transaction with the small business is desired by the small business, and/or is of interest to the prospective buyer/investor/licensee.

The present invention in this exemplary embodiment may be offered in at least a partially secure manner, such wherein only limited information about the small business may be made available by the small business. A licensing or private labeling model as discussed in this section may be provided, for example, as a bundled tool, a web-based or widgetized tool, a hyperlinked tool, or as a stand-alone. The licensing or private labeling model in this embodiment may be based upon an up front payment from the broker, a royalty per transaction, and/or a license based on number of transactions engaged in by the broker, by way of non-limiting example.

Those of skill in the art will appreciate that the herein described systems and methods may be subject to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

What is claimed is:

1. A computer-implemented system for generating a business valuation, comprising:
   a tangible computing processor;
   a network port in data communication with the processor that communicatively couples the processor to a network;
   a non-transitory computer readable storage device in data communication with the processor and having encoded thereon computer executable instructions which, when executed on the processor, implement:
   a graphical user interface that prompts a valuation requester to input information of a company, including general information, financial information, and presence information of the company, wherein the financial information includes information pertaining to deferred compensation certified to be in compliance with tax reporting requirements;
   a query engine that queries third party locations on the network for information related to the company;
   a valuation engine having a plurality of rules that calculates, in accordance with the plurality of rules, a business valuation of the company using the input company information and the information related to the company from the third party locations;
   a reporting engine that delivers the business valuation in a report;
   wherein the calculating the business valuation includes:
      determining a valuation multiplier based on at least one of a code that classifies business establishments according to a type of economic activity in Canada, Mexico, and the United States of America, a projected revenue growth, and a long term earnings before interest, taxes, depreciation and amortization (ebitda) margin;
      calculating a seller's discretionary earnings (SDE) as at least a sum of year-weighted averages of pretax income, owner salary, owner benefits, one-time benefits, interest expense, and one-time costs, wherein each respective weighted average is determined as a subject of variables y1, y2, and y3, wherein y1 is the value of the subject variable for the most recent year, y2 is the subject variable for the year immediately preceding y1, and y3 is the value of the subject variable for the year immediately preceding y2, and wherein w is determined by:
      if y1 is not provided, then w is zero;
      else if y1 is the only year provided, then w is y1;
      else if y1 and y2 are the only years provided, then w is (y1×R1)+(y2×R2);
      else if y1 and y3 are the only years provided, then w is (y1×R1)+(y2×R2);
      else if y1, y2, and y3 are all provided, then w is (y1×R3)+(y2×R4)+(y3×R5);
      wherein Rn is a predetermined ratio, and wherein the sum of all Rn for any w is 1;
      adjusting the calculated SDE for inflation and pre-tax growth,
      calculating an interim valuation based on a product of the adjusted SDE and the valuation multiplier; and
      calculating the valuation by applying to the interim valuation at least one of a negative valuation adjustment, a recurring revenue adjustment, an intellectual property adjustment, an adjustment based on sales to a select number of top customers as a percentage of total sales, an adjustment to subtract recent year debt, an adjustment to add recent year cash, an adjustment to subtract 50% of recent year depreciation, an adjustment to add recent year fixed assets, an adjustment to add 80% of recent year accounts receivable, and an adjustment to add 75% of recent year inventory.

2. The system of claim 1, wherein the company information is used with information of at least one of a recent change in the circumstances of the company and a recent change in an industry of the company to calculate an enhanced business valuation.

3. The system of claim 1, wherein the business valuation includes a value of at least one asset that is one of a tangible asset, a liquid asset, and a financial instrument.

4. The system of claim 3, wherein at least one of the assets is one of a promissory note, a pledge, a purchase order, an account receivable, cash, and an option.

5. The system of claim 1, wherein code for presenting the graphical user interface is generated remotely from the valuation requester.

6. The system of claim 1, wherein the graphical user interface prompts the valuation requester for an information flag.

7. The system of claim 6, wherein the information flag is user selectable.

8. The system of claim 5, wherein the graphical user interface code is accessible from at least two remote locations.

9. The system of claim 1, wherein the graphical user interface is accessible by at least two valuation requesters.

10. The system of claim 1, wherein the valuation requester is not associated with the company.

11. The system of claim 1, wherein the certified company information is received from a professionally credentialed third party.

12. A computer-implemented method for generating a business valuation, comprising:
   a computer prompting a valuation requester to input, via a graphical user interface, information of a company, including general information, financial information, and presence information of the company, wherein the financial information includes information pertaining to deferred compensation certified to be in compliance with tax reporting requirements;
   the computer querying third party locations on a network for information related to the company;
   the computer calculating a business valuation of the company in accordance with a plurality of rules, using the input company information and the information related to the company from the third party locations; and
   the computer outputting the business valuation;
   wherein the calculating the business valuation by the computer includes:
      determining a valuation multiplier by:
      determining a valuation multiplier based on at least one of a code that classifies business establishments according to a type of economic activity in Canada, Mexico, and the United States of America, a projected revenue growth, and a long term earnings before interest, taxes, depreciation and amortization (ebitda) margin;
      calculating a seller's discretionary earnings (SDE) as at least a sum of year-weighted averages of pretax income, owner salary, owner benefits, one-time benefits, interest expense, and one-time costs, wherein each respective weighted average is determined as a subject of variables y1, y2, and y3, wherein y1 is the value of the subject variable for the most recent year, y2 is the subject variable for the year immediately preceding y1, and y3 is the value of the subject variable for the year immediately preceding y2, and wherein w is determined by:

if y1 is not provided, then w is zero;

else if y1 is the only year provided, then w is y1;

else if y1 and y2 are the only years provided, then w is $(y1 \times R1)+(y2 \times R2)$:

else if y1 and y3 are the only years provided, then w is $(y1 \times R1)+(y2 \times R2)$;

else if y1, y2, and y3 are all provided, then w is $(y1 \times R3)+(y2 \times R4)+(y3 \times R5)$;

wherein Rn is a predetermined ratio, and wherein the sum of all Rn for any w is 1;

adjusting the calculated SDE for inflation and pre-tax growth, calculating an interim valuation based on a product of the adjusted SDE and the valuation multiplier; and calculating the valuation by applying to the interim valuation at least one of a negative valuation adjustment, a recurring revenue adjustment, an intellectual property adjustment, an adjustment based on sales to a select number of top customers as a percentage of total sales, an adjustment to subtract recent year debt, an adjustment to add recent year cash, an adjustment to subtract 50% of recent year depreciation, an adjustment to add recent year fixed assets, an adjustment to add 80% of recent year accounts receivable, and an adjustment to add 75% of recent year inventory.

13. The method of claim 12, wherein the company information is used with information of at least one of a recent change in the circumstances of the company and a recent change in an industry of the company to calculate an enhanced business valuation.

14. The method of claim 12, wherein the input company information includes at least one of a third party payment score, a credit score, a tax return, liabilities, debt incurred, and cash accrued.

15. The method of claim 12, wherein the business valuation includes a value of at least one asset that is one of a tangible asset, a liquid asset, and a financial instrument owned by the company.

16. The method of claim 15, wherein at least one of the assets is one of a promissory note, a pledge, a purchase order, an account receivable, cash, and an option.

17. The method of claim 12, wherein the graphical user interface prompts the valuation requester for at least one information flag.

18. The method of claim 17, wherein the information flag is selectable by the valuation requester.

19. The method of claim 12, wherein code for presenting the graphical user interface is generated remotely from the valuation requester.

20. The method of claim 12, wherein the certified company information is obtained from a professionally credentialed third party.

* * * * *